(12) United States Patent
Ren et al.

(10) Patent No.: US 7,407,721 B2
(45) Date of Patent: Aug. 5, 2008

(54) DIRECT OXIDATION FUEL CELL OPERATING WITH DIRECT FEED OF CONCENTRATED FUEL UNDER PASSIVE WATER MANAGEMENT

(75) Inventors: Xiaoming Ren, Menands, NY (US); Juan J. Becerra, Altamont, NY (US); Robert S. Hirsch, Troy, NY (US); Shimshon Gottesfeld, Niskayuna, NY (US); Frank W. Kovacs, Waterford, NY (US); Kevin J. Shufon, Troy, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 340 days.

(21) Appl. No.: 10/413,983

(22) Filed: Apr. 15, 2003

(65) Prior Publication Data

US 2004/0209136 A1    Oct. 21, 2004

(51) Int. Cl.
*H01M 8/00* (2006.01)
*H01M 2/00* (2006.01)
*H01M 4/00* (2006.01)
(52) U.S. Cl. ............................. 429/13; 429/24; 429/41
(58) Field of Classification Search .................. 429/13, 429/30, 42, 44, 34, 41
See application file for complete search history.

(56) References Cited

U.S. PATENT DOCUMENTS

| | | | |
|---|---|---|---|
| 4,046,956 A | 9/1977 | Fanciullo | |
| 4,132,695 A | 1/1979 | Burkholder | |
| 4,478,917 A | 10/1984 | Fujita et al. | |
| 4,537,840 A | 8/1985 | Tsukui et al. | |
| 4,562,123 A | 12/1985 | Shimizu et al. | |
| 4,593,534 A | 6/1986 | Bloomfield | |
| 4,612,261 A | 9/1986 | Tsukui et al. | |
| 4,673,624 A | 6/1987 | Hockaday | |
| 4,810,597 A | 3/1989 | Kumagai et al. | |
| 4,828,941 A | 5/1989 | Sterzel | |
| 4,931,168 A | 6/1990 | Watanabe et al. | |
| 5,409,785 A | 4/1995 | Nakano et al. | |

(Continued)

FOREIGN PATENT DOCUMENTS

EP    0907979 B1    3/2000

(Continued)

OTHER PUBLICATIONS

A. Blum et al., "Water-neutral Micro Direct-Methanol Fuel Cell (DMFC) for Portable Applications," The Journal of Power Sources, vol. 117 (May 15, 2003), pp. 22-25.

(Continued)

*Primary Examiner*—Patrick Joseph Ryan
*Assistant Examiner*—Thomas H. Parsons
(74) *Attorney, Agent, or Firm*—Cesari and McKenna LLP

(57) ABSTRACT

A passive direct oxidation fuel cell system, which uses a high concentration fuel such as neat methanol as a direct feed to an anode aspect of the fuel cell, is provided. The fuel cell includes a passive water management capability, achieved by the combined functions of controlled fuel dosing, effective push back of liquid water from the cathode through the membrane electrolyte by a hydrophobic microporous layer well bonded to the cathode catalyst and the use of a thin ionomeric membrane. The rate of fuel delivery is controlled by a passive fuel transport barrier. Carbon dioxide management techniques are also provided.

82 Claims, 9 Drawing Sheets

U.S. PATENT DOCUMENTS

| | | | |
|---|---|---|---|
| 5,432,023 | A | 7/1995 | Yamada et al. |
| 5,460,896 | A | 10/1995 | Takada et al. |
| 5,482,792 | A | 1/1996 | Faita et al. |
| 5,523,177 | A | 6/1996 | Kosek et al. |
| 5,573,866 | A | 11/1996 | Van Dine et al. |
| 5,599,638 | A | 2/1997 | Surampudi et al. |
| 5,629,104 | A | 5/1997 | Crawford, Sr. et al. |
| 5,631,099 | A | 5/1997 | Hockaday |
| 5,641,585 | A | 6/1997 | Lessing et al. |
| 5,686,200 | A | 11/1997 | Barton et al. |
| 5,723,228 | A | 3/1998 | Okamoto |
| 5,723,229 | A | 3/1998 | Scheifers et al. |
| 5,759,712 | A | 6/1998 | Hockaday |
| 5,766,786 | A | 6/1998 | Fleck et al. |
| 5,773,162 | A | 6/1998 | Surampudi et al. |
| 5,795,668 | A | 8/1998 | Banerjee et al. |
| 5,916,699 | A | 6/1999 | Thomas et al. |
| 5,925,476 | A | 7/1999 | Kawatsu |
| 5,945,231 | A | 8/1999 | Narayanan et al. |
| 5,992,008 | A | 11/1999 | Kindler |
| 5,993,986 | A | 11/1999 | Wallin et al. |
| 6,024,848 | A | 2/2000 | Dufner et al. |
| 6,130,175 | A | 10/2000 | Rusch et al. |
| 6,232,010 | B1 | 5/2001 | Cisar et al. |
| 6,248,469 | B1 | 6/2001 | Formato et al. |
| 6,265,093 | B1 | 7/2001 | Surampudi et al. |
| 6,268,077 | B1 | 7/2001 | Kelley et al. |
| 6,296,964 | B1 | 10/2001 | Ren et al. |
| 6,303,244 | B1 | 10/2001 | Surampudi et al. |
| 6,322,917 | B1 | 11/2001 | Acker |
| 6,322,918 | B1 | 11/2001 | Kelley et al. |
| 6,350,540 | B1 | 2/2002 | Sugita et al. |
| RE37,656 | E | 4/2002 | Bahar et al. |
| 6,387,559 | B1 | 5/2002 | Koripella et al. |
| 6,410,180 | B1 | 6/2002 | Cisar et al. |
| 6,420,059 | B1 | 7/2002 | Surampudi et al. |
| 6,447,941 | B1 | 9/2002 | Tomimatsu et al. |
| 6,447,943 | B1 | 9/2002 | Peled et al. |
| 6,458,479 | B1 * | 10/2002 | Ren et al. ............ 429/33 |
| 6,465,119 | B1 | 10/2002 | Koripella et al. |
| 6,492,047 | B1 | 12/2002 | Peled et al. |
| 6,497,975 | B2 | 12/2002 | Bostaph et al. |
| 6,506,513 | B1 | 1/2003 | Yonetsu et al. |
| 6,509,112 | B1 | 1/2003 | Luft et al. |
| 6,566,003 | B2 | 5/2003 | Acker |
| 6,632,553 | B2 | 10/2003 | Corey et al. |
| 6,686,081 | B2 | 2/2004 | Gottesfeld |
| 6,808,838 | B1 | 10/2004 | Wilson |
| 6,811,905 | B1 * | 11/2004 | Cropley et al. ............ 429/13 |
| 2001/0049045 | A1 | 12/2001 | Hockaday et al. |
| 2001/0051293 | A1 | 12/2001 | Narayanan et al. |
| 2002/0076599 | A1 | 6/2002 | Neutzler et al. |
| 2002/0155341 | A1 | 10/2002 | Finkelshain et al. |
| 2002/0172851 | A1 | 11/2002 | Corey et al. |
| 2002/0182459 | A1 | 12/2002 | Hockaday et al. |
| 2002/0197522 | A1 | 12/2002 | Lawrence et al. |
| 2003/0049510 | A1 | 3/2003 | Ren |
| 2003/0129464 | A1 | 7/2003 | Becerra et al. |
| 2003/0157395 | A1 | 8/2003 | Ren et al. |
| 2003/0162070 | A1 | 8/2003 | Hirsch et al. |
| 2004/0062980 | A1 | 4/2004 | Ren et al. |
| 2004/0209136 | A1 | 10/2004 | Ren et al. |
| 2004/0265680 | A1 | 12/2004 | Ren et al. |

FOREIGN PATENT DOCUMENTS

| | | |
|---|---|---|
| EP | 1 150 370 A2 | 10/2001 |
| EP | 1 274 244 A2 | 1/2003 |
| WO | 01/75999 A1 | 10/2001 |
| WO | 03/026035 A2 | 3/2003 |
| WO | 03/026035 A3 | 3/2003 |
| WO | 06/077345 A1 | 9/2003 |

OTHER PUBLICATIONS

Lubovskiy, V.V. et al., System for Monitoring and Regulating Fuel Concentration in an Anolyte, USSR Author's Certificate, SU 1,610,522 A1, Int'l Classification 5 H 01 M Aug. 2004, Application Date: Sep. 15, 1988, Published Nov. 30, 1990, all pages.

Ren, et al., Methanol Cross-Over in Direct Methanol Fuel Cells, Electronic and Electrochemical Materials and Devices, MST-11, MS-D429, Los Alamos National Laboratory, Oct. 1995, Electrochemical Society Proceedings vol. 95-23, pp. 284-293.

Narayanan et al., Electrochemical Characteristics of Carbon-Supported Pt, Pt-5n, Pt-Ru Electrodes for the Oxidation of Methanol and Formaldehyde, from Fuel Cell Program and Abstracts, 1992 Fuel Cell Seminar, Nov. 29, 1992-Dec. 2, 1992, pp. 233-236 and 461-464.

Maynard et al., Miniaturized Fuel Cells for Portable Power, Prepared for presentation at the conference on Small Fuel Cells and Battery Technologies 2000, Apr. 27-28, 2000, New Orleans, LA all pages.

Sharke, Pocket-Size PEMs, Http://www.memagazine.org/contents/current/features/pems/pems.html, downloaded from website on Jul. 25, 2000.

Gottesfeld et al., Polymer Electrolyte Fuel Cells as Potential Power Sources for Portable Electronic Devices, pp. 487-517.

Invitation to Pay Additional Fees and Partial International Search, PCT/US2004/011406, mailed Sep. 1, 2005, 9 pgs.

Notification of Transmittal of the International Search Report and the Written Opinion of the International Searching Authority, or the Declaration, PCT/US2004/011406, mailed Nov. 4, 2005, 12 pgs.

Notification of Transmittal of the International Search Report and the Written Opinion of the International Searching Authority, or the Declaration, PCT/US2004/020709, mailed Nov. 4, 2005, 20 pgs.

Invitation to Pay Additional Fees and Partial International Search, PCT/US2004/020709, mailed Sep. 1, 2005, 10 pgs.

Notification of the Transmittal of the International Search Report, or the Declaration, PCT/US03/04766, mailed May 8, 2003, 6 pgs.

Mund, K. et al., Analysis of a Direct Methanol Fuel Cell Using a Solid Polymer Electrolyte Membrane, from Fuel Cell Program and Abstracts, 1992 Fuel Cell Seminar, Nov. 29, 1992-Dec. 2, 1992, pp. 461-464.

"Notification of Transmittal of the International Search Report and theWritten Opinion of the International Searching Authority, or the Declaration" for International Application No. PCT/US2005/046380 With an International Filing Date of Dec. 21, 2005.

* cited by examiner

DIRECT OXIDATION FUEL CELL OPERATING WITH DIRECT FEED OF CONCENTRATED FUEL UNDER PASSIVE WATER MANAGEMENT

BACKGROUND OF THE INVENTION

1. Field of the Invention

This invention relates generally to direct oxidation fuel cells, and more particularly, to fuel cells that operate with delivery of high concentration fuel and passive water management.

2. Background Information

Fuel cells are devices in which an electrochemical reaction involving a fuel molecule is used to generate electricity. A variety of compounds may be suited for use as a fuel depending upon the specific nature of the cell. Organic compounds, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Many currently developed fuel cells are reformer-based systems. However, because fuel processing is complex and generally requires components which occupy significant volume, reformer based systems are presently limited to comparatively large, high power applications.

Direct oxidation fuel cell systems may be better suited for a number of applications in smaller mobile devices (e.g., mobile phones, handheld and laptop computers), as well as in some larger scale applications. In direct oxidation fuel cells of interest here, a carbonaceous liquid fuel (typically methanol or an aqueous methanol solution) is introduced to the anode face of a membrane electrode assembly (MEA).

One example of a direct oxidation fuel cell system is a direct methanol fuel cell system, or DMFC system. In a DMFC system, methanol or a mixture comprised of methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water.

Typical DMFC systems include a fuel source, fluid and effluent management sub-systems, and air management sub-systems, in addition to the direct methanol fuel cell itself ("fuel cell"). The fuel cell typically consists of a housing, hardware for current collection and fuel and air distribution, and a membrane electrode assembly ("MEA"), which are all typically disposed within the housing.

The electricity generating reactions and the current collection in a direct oxidation fuel cell system take place within and on the MEA. In the fuel oxidation process at the anode, the products are protons, electrons and carbon dioxide. Protons (originating from fuel and water molecules involved in the anodic reaction) migrate through the catalyzed membrane electrolyte, which is impermeable to the electrons. The electrons travel through an external circuit, which includes the load, and are united with the protons and oxygen molecules in the cathodic reaction, thus providing electrical power from the fuel cell and water product at the cathode of the fuel cell.

A typical MEA includes a centrally disposed protonically-conductive, electronically non-conductive membrane ("PCM", sometimes also referred to herein as "the catalyzed membrane"). One example of a commercially available PCM is Nafion® a registered trademark of E.I. Dupont de Nemours and Company, a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the catalyzed anode face of the PCM, while allowing the gaseous product of the reaction, typically carbon dioxide, to move away from the anode face of the PCM. In the case of the cathode side, a wet-proofed diffusion layer is used to allow a sufficient supply of oxygen by minimizing or eliminating the build-up of liquid, typically water, on the cathode aspect of the PCM. Each of the anode and cathode diffusion layers also assists in the collection and conduction of electric current from the catalyzed PCM.

Direct oxidation fuel cell systems for portable electronic devices should be as small as possible at the power output required. The power output is governed by the rate of the reactions that occur at the anode and the cathode of the fuel cell. More specifically, the anode process in direct methanol fuel cells based on acidic electrolytes, including polyperflourosulfonic acid and similar polymer electrolytes, involves a reaction of one molecule of methanol with one molecule of water. In this process, the oxygen atom in the water molecule is electrochemically activated to complete the oxidation of methanol to a final $CO_2$ product in a six-electron process, according to the following chemical equation $$CH_3OH + H_2O = CO_2 + 6H^+ + 6\ e^- \tag{1}$$

Since water is a reactant in this anodic process at a molecular ratio of 1:1 (water:methanol), the supply of water, together with methanol, to the anode at an appropriate weight (or volume) ratio is critical for sustaining this process in the cell. In fact, it has been known that the water:methanol molecular ratio in the anode of the DMFC has to significantly exceed the stoichiometric, 1:1 ratio shown by process (1). This excess is required to guarantee complete, 6 electron anodic oxidation to $CO_2$, rather than partial oxidation to either formic acid, or formaldehyde, 4 $e^-$ and 2 $e^-$ processes, respectively, described by equations (2) and (3) below:

$$CH_3OH + H_2O = HCOOH + 4H^+ + 4\ e^- \tag{2}$$

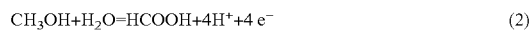

$$CH_3OH = H_2CO + 2H^+ + 2\ e^- \tag{3}$$

Equations (2) and (3) describe partial processes that are not desirable and which might occur if anode water content is not sufficient during a steady state operation of the cell. Particularly, as is indicated in process (3), involving the partial oxidation of methanol, water is not required for this anode process and thus, this process may dominate when the water level in the anode drops below a certain point. The consequence of process (3) domination, is an effective drop in methanol energy content by 66% compared with consumption of methanol by process (1), which would result in a lower cell electric energy output. In addition, it might lead to the generation of a hazardous anode product (formaldehyde).

Typically, it has been difficult to provide in a tightly volume-limited DMFC technology platform, the high ratio water/methanol mixture at the anode catalyst that ensures effective and exclusive anode process (1). The conventional approaches to this problem can be divided into two categories:

(A) active DMFC systems, utilizing reservoirs of neat methanol and based on liquid pumping, and (B) passive systems requiring no pumping, utilizing reservoirs containing methanol/water mixtures.

Class A, "active" systems that include pumping, can maintain, in principle, appropriate water content in the anode, by dosing neat methanol from a fuel delivery cartridge into an anode fluid recirculation loop. The loop typically receives water collected at the cathode and pumped back into the recirculating anode liquid. In this way, an optimized water/methanol anode mix can be maintained in a system with neat methanol in the cartridge. The concentration within the anode can be controlled using a methanol concentration sensor. The advantage of this approach is that neat methanol (100% methanol) or a very high methanol concentration solution can be carried in the cartridge. Carrying a high concentration fuel source maximizes the energy content of the overall system. The disadvantage of Class A systems is that while neat methanol can be carried in the cartridge, the system suffers from excessive complexity due to the pumping and recirculation components which result in significant parasitic power losses and increase in system volume. Such power losses can be particularly severe, relative to fuel cell power output, in the case of small scale power sources.

The class B systems, which are passive in nature, have the advantage of system simplicity achieved by potentially eliminating pumping and recirculation by using a design that carries a mixture of water and methanol in the fuel source reservoir. This type of system can be substantially completely passive as long as the rate of water loss through the cathode is adjusted by means of materials and structures. These materials and structures operate to match the reservoir composition so as to ensure zero net rate of water loss (or water accumulation) in the cell. The problem with this approach is that it requires that the system carries a significant amount of water together with the methanol in the cartridge. Carrying a methanol/water mix in the reservoir or cartridge, of a composition well under 100% methanol, results in a significant penalty in energy density of the power pack.

A fuel cell system that adapts the best features of both the Class A and Class B, (without the disadvantages of these two known systems,) would be quite advantageous. However, the possibility of supply of highly concentrated methanol, including 100% methanol, directly from a reservoir into the anode compartment, has not been considered practical without, at the same time, supplying water as well into the anode compartment by either collecting it from the cathode and externally pumping it back or, alternatively, directly feeding water from a reservoir of water-diluted methanol. In other words, the combination "Passive DMFC System" and "Neat Methanol Supply to the Anode" has not been considered feasible, as this has been fully expected to result in significant loss of methanol flowing across the membrane (significant methanol "cross-over") and/or in an anode process different than (1).

There remains a need therefore, for a passive DMFC system, i.e., a system not requiring pumping and recirculation loops, that allows the direct supply of neat (100%) methanol to the anode. There remains a further need for such a system that passively maintains a water profile within the fuel cell, i.e., that will establish such desirable profile without active collection and pumping of water from the cathode, while using methanol in the tank or cartridge that is more concentrated than a 1:1 methanol/water mixture. Such a system should also include the additional important feature of effective management of anodically-generated carbon dioxide.

It is thus an object of the present invention to provide a direct oxidation fuel cell system that is capable of carrying highly concentrated, including neat (100%) methanol as the fuel source, and delivering such fuel directly to the anode; it is a further object that the cell of the present invention uses passive water management and effective passive carbon dioxide removal techniques.

SUMMARY OF THE INVENTION

The disadvantages of prior techniques are overcome by the present invention, which provides a unique, passive direct oxidation fuel cell system, which includes the following features: 1) the fuel cell system carries a high concentration fuel, including the option of neat methanol; 2) the fuel cell system limits the delivery rate of the fuel so that the fuel substance is at the appropriate concentration level when it comes into contact with the anode face of the catalyzed membrane and mixes there with water provided internally from the cathode; 3) the fuel cell system of the present invention includes passive water management components for maintaining a balanced distribution in the cell, without pumps and recirculation loops; and 4) the fuel cell includes features and components for effective carbon dioxide release from the anode chamber of the fuel cell.

In accordance with one aspect of the invention, an optimized water profile within the fuel cell is achieved by using water management elements to confine a substantial portion of the water of the fuel cell between the two diffusion layers, minimizing water loss or discharge from the fuel cell. This is accomplished using a water management component such as a hydrophobic microporous layer, or a water management film placed in intimate contact with the cathode catalyst, or with both anode and cathode catalyst layers, and applying sufficient compression to maintain effective uniform adhesion of such water management component to the catalyst layer even as liquid water builds up at the interface between the catalyst layer and said water management component, thus ensuring water back-flow from the cathode into the membrane.

More specifically, water is generated and transported in the operation of the fuel cell due to a number of different processes. First, the protonically-conductive membrane electrolyte of the fuel cell, (typically Nafion®), must be well hydrated in order to conduct protons effectively. Nafion® absorbs water and thus allows the protons in the electricity-generating reaction, i.e., the 6H+ in process (1) described above, to pass through the membrane attached to water molecules. The process at the cathode involves generation of water according to the cathode half reaction of $\frac{3}{2}O_2+6H^++6 e^-=3H_2O$. and there is thus a net production of water in a direct oxidation fuel cell environment. However, this water is not optimally distributed within the cell because water accumulates at the cathode of the cell at a rate proportional to cell current as determined by the sum of the water generation rate in the cathode reaction noted above, and the water flow (or drag) across the membrane from anode to cathode accompanying the flow of protons. Water gets depleted from the anode at a rate proportional to cell current, because water is utilized in the process at the anode, i.e., process (1) noted above.

Consequently, a net flow of water from anode to cathode typically occurs as current is generated by the fuel cell. Therefore, in order to maintain optimal water distribution between cell anode and cell cathode, as required for sufficient water availability for the anodic process and in order to keep the Nafion® membrane well hydrated, typical Class A DMFC systems collect water from the cathode and actively return it to the anode externally to the fuel cell via recirculation and pumping subsystems. As noted, these pumps can complicate the system, increase its volume and result in parasitic power losses.

In accordance with the present invention, instead of actively circulating the water back into the anode, the invention described pushes liquid water back from the cathode to the anode through the cell membrane. In accordance with one aspect of the present invention, a hydrophobic microporous layer is utilized as a water management membrane that is disposed in the cathode chamber of the fuel cell between the cathode diffusion layer and the catalyzed membrane electrolyte. In this way, water that is produced in the cathode half reaction is blocked by the severe barrier to liquid water penetration presented by a microporous hydrophobic layer which consequently applies back hydrostatic pressure which pushes water from the cathode back into and through the membrane electrolyte. The water management element may be comprised of a film of expanded PTFE (preferably impregnated with carbon microparticles to facilitate electronic conduction), or it may be a microporous layer, based on carbon microparticles impregnated with PTFE, attached to the carbon cloth or carbon paper backing material. Regardless of its construction, this layer must be gas permeable to allow oxygen to the cathode catalyst while substantially preventing liquid water from escaping. Additional conditions for effective push-back of liquid water into the membrane, are effective bonding between the catalyst and water management layer and sufficient mechanical compression across the cell applied by appropriate framing, that keeps the microporous layer, or microporous film, well attached to the catalyst layer even as water pressure builds up at this interface in a cell under current.

The unique features of the present invention allow this optimized water distribution in the cell to be maintained, even when neat methanol is directly supplied from the fuel cartridge (or reservoir). The present invention enables to deliver the neat fuel at the appropriate rate into the anode chamber as required to achieve an optimized, low concentration in contact with the anode face of the catalyzed membrane, to which face water is effectively supplied internally across the membrane from the cathode. As noted herein, the desirable reaction at the anode is process (1), which involves one molecule of methanol and one molecule of water, and in order for this reaction to proceed the rate of methanol supply has to be controlled such that a sufficient amount of water that is needed for process (1) to occur, flows back from the cathode into the anode chamber.

One important feature of this invention is the selection of an anodic mass-transport barrier that provides an optimized rate of fuel delivery from a reservoir of very concentrated methanol and preferably neat or near neat methanol, to the anode aspect of the membrane electrolyte.

In reduction to practice of Class A or Class B Systems, as described herein, fuel delivery rate is typically controlled by pumping or other active method. In the present invention, fuel delivery rate is controlled passively, as set forth in commonly-assigned United States Patent Application of Ren et al., entitled FLUID MANAGEMENT COMPONENT FOR USE IN A FUEL CELL, U.S. application Ser. No. 10/260,820, filed Sep. 30, 2002, and which is incorporated herein. The delivery rate can be controlled through a mass transport barrier if the proper delivery rate can be defined and the permeability of methanol through such barrier is measurable under the relevant cell conditions and can be set with readily available material properties, within a desired range.

For the invention, the correct measure of the fuel permeability in a passive DMFC with concentrated, or neat, methanol supply, is the limiting rate of methanol delivery measured as the limiting current ($J_{Lim}$) of methanol oxidation in the fuel cell where a mass transport barrier has been implemented in front of the anode aspect. In such a measurement, the anode is polarized using a slow rate of potential scan and the anode current is recorded to reveal the current limit. Since the rate of methanol supply is determined by the permeability of the passive barrier, this permeability will cause "saturation" of the current with increased anode potential at a current saturation (current plateau) level corresponding to the rate of methanol transport through the barrier in the anode, under conditions of actual fuel cell operation. Once $J_{Lim}$ has been measured for any type of mass transport barrier chosen, it defines an operating fuel cell range of current densities, $J_{cell}$, that are 50–90% of $J_{Lim}$. Within such range of $J_{cell}$, high fuel utilization can be reached, as fuel utilization in such cells with anode transport barrier is well approximated by the ratio $J_{cell}/J_{lim}$. Consequently, choice of the optimized transport barrier for operation with, for example, neat methanol, will be based on methanol permeability through such barrier at the relevant design cell temperature from a neat liquid methanol source into the relevant anode compartment. This rate should correspond to a measured $J_{Lim}$ which is 10%–50% larger than the current density achievable with present electrocatalyst and cell technology at a given design voltage and temperature.

In order to satisfy all of these considerations, the present invention provides a fuel transport barrier, which, in one embodiment of the invention is a methanol vapor delivery film, which is typically placed between the fuel source and the catalyzed membrane electrolyte and along the same plane as of the catalyzed membrane electrolyte. The transport barrier is in such case comprised of a thin, phase-changing "pervaporation" film that acts as a controlled fuel delivery barrier between a concentrated methanol source and anode face of the membrane electrolyte assembly. The methanol delivery film controls the rate of fuel transport across the film, as set by selecting a material, or materials for the film and the film thickness. The inventive anode transport barrier allows the use of a neat methanol feed, yet defines a controlled rate of fuel delivery to result, following mixing with the internally supplied water from the cathode, in the appropriate low concentration of methanol at the anode catalyst. The methanol delivery film may be integrated as part of a cartridge or can be part of the fuel cell system itself, when fuel is stored internal to the system.

The third substance which must be managed in order to allow the electricity-generating reactions to proceed with higher efficiency, is carbon dioxide. As noted, in the anode process in a direct methanol fuel cell, the water molecule is electrochemically activated to complete the oxidation of methanol to the final product of carbon dioxide. If the anodically generated carbon dioxide builds up in the anode chamber it displaces fuel volume and presents local transport barriers.

In accordance with the present invention, carbon dioxide can be routed away from the anode using unique carbon dioxide routers formed into the anode chamber. Alternatively, the carbon dioxide generated at the anode surface can be passed through channels through the thickness dimension of the membrane electrolyte into the cathode chamber, and be released from the cell through the cathode.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
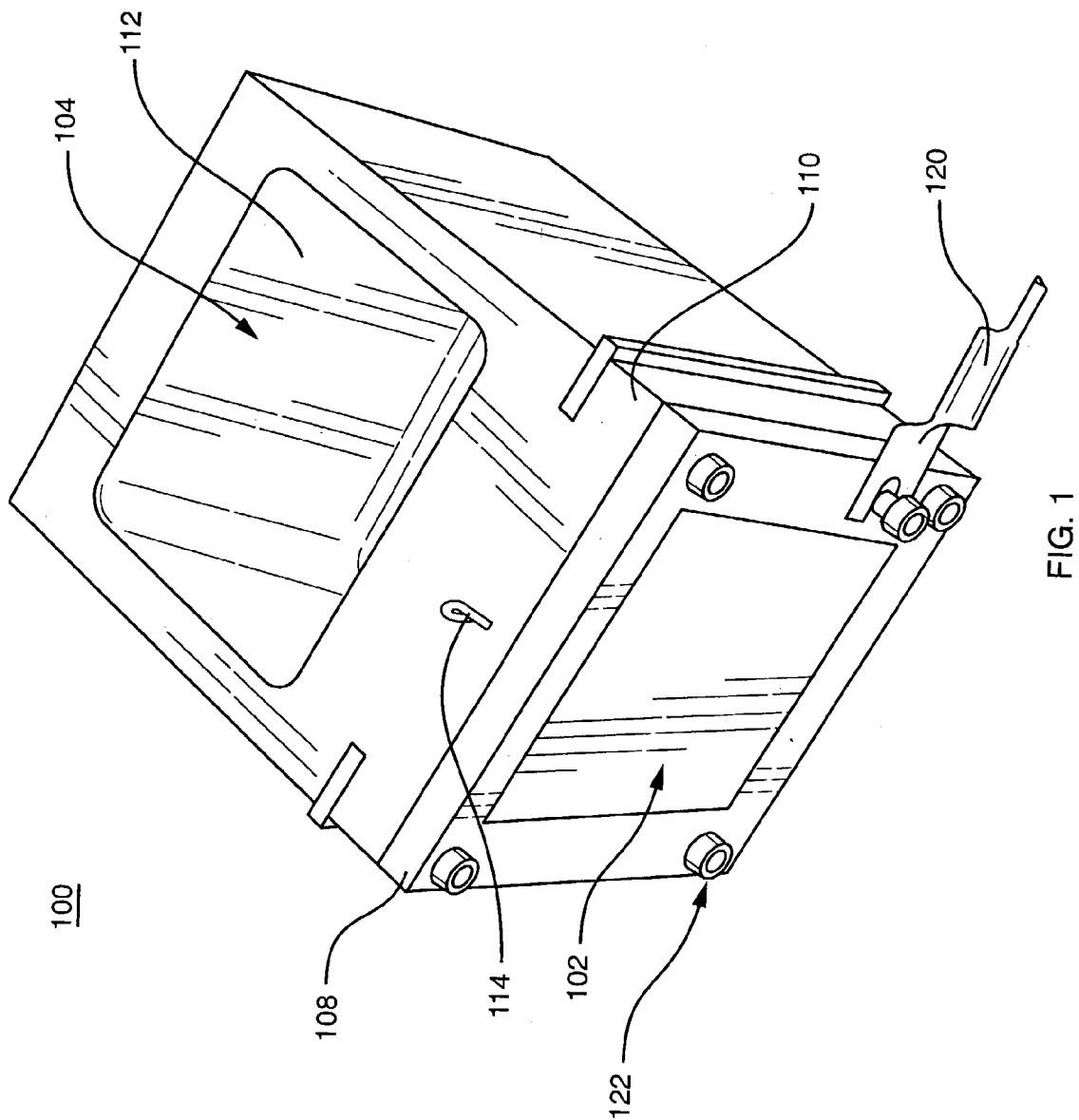
FIG. 1 is an isometric illustration of a fully assembled direct oxidation fuel cell including a fuel reservoir constructed in accordance with one embodiment of the invention.

FIG. 1 illustrates a direct oxidation fuel cell system 100 that includes a direct oxidation fuel cell 102 in conjunction with a fuel reservoir 104. The fuel cell 102 is held together by a frame 108 and it is encapsulated within a plastic exterior housing 110, which may be comprised of a plastic. The fuel reservoir 104 has a recess 112 into which fuel or a fuel cartridge is inserted to begin the delivery of fuel to the anode portion of the fuel cell as will be discussed in further detail hereinafter. The anode portion of the fuel cell has no liquid outlet. In FIG. 1, the active surface of the cathode is located on the aspect corresponding to the front face of the cell as shown. The anode current collection lead 114 is in ohmic contact with the anode current collector (hidden in FIG. 1) and can be connected with the cathode current collector lead 120 to form an electrical circuit and a load can be connected across the leads 114 and 120 to utilize the electricity produced by the fuel cell. Bolts 122 provide significant compression on the frame of the cell, translated to the main surface of the membrane/electrode assembly by rigid current collectors, thereby ensuring good uniform adhesion, particularly between surfaces 244 and 208, as required for effective, passive water management.

Water Management Features and Structures

Figure 2:
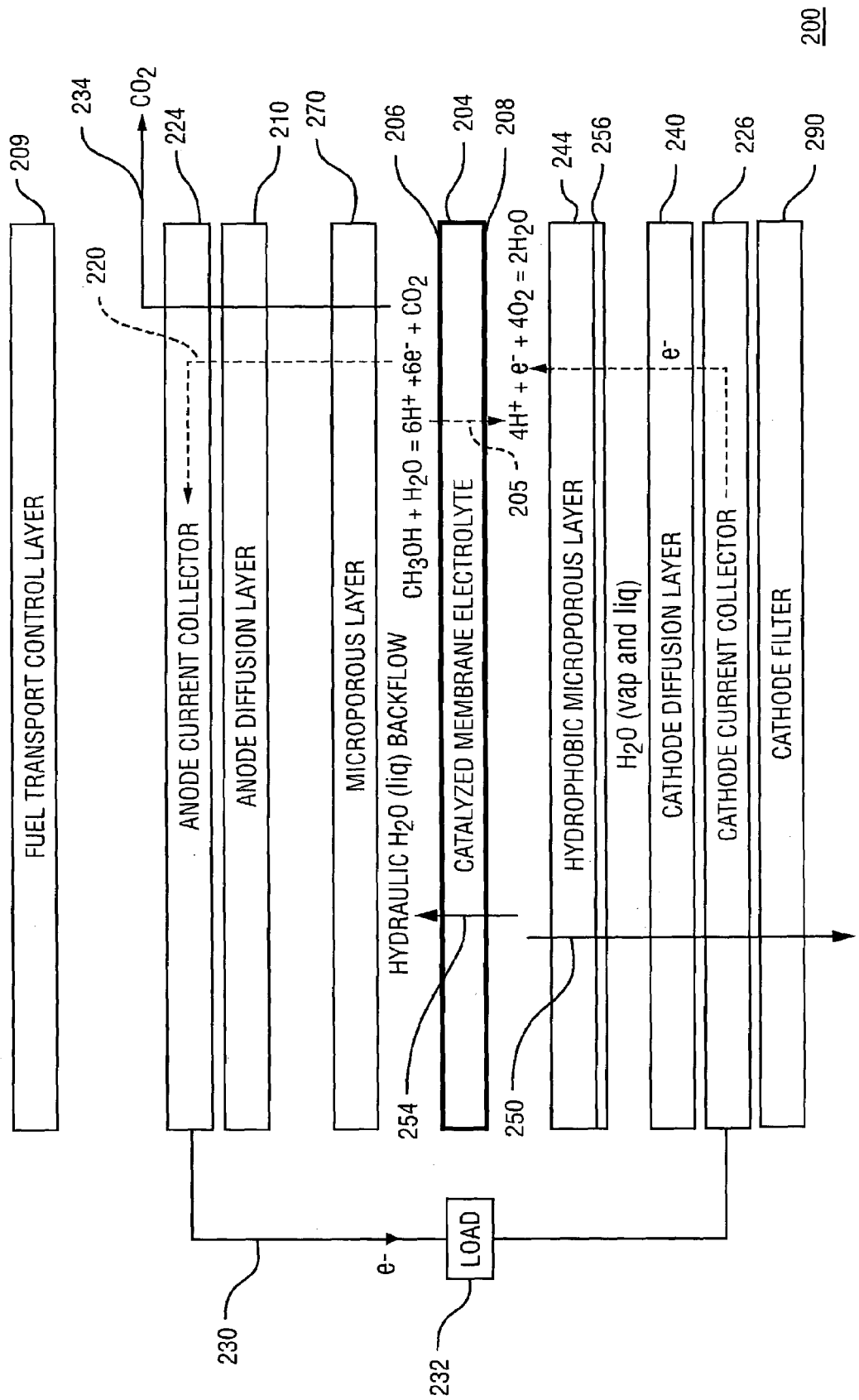
FIG. 2 is a simplified schematic illustration of a direct oxidation fuel cell including the water management components of the present invention.

FIG. 2 is a simplified schematic illustration of the unique water management features and structures of the passive system of the present invention. The figure illustrates one embodiment of the direct oxidation fuel cell of the present invention for purposes of description though the invention set forth herein may include a number of other components in addition to those shown while remaining within the scope of the present invention. Many alternative fuel cell architectures are within the scope of the present invention. Further, the illustrative embodiment of the invention is a DMFC with the fuel substance being substantially comprised of neat methanol. It should be understood, however, that it is within the scope of the present invention that other fuels may be used in an appropriate fuel cell. Thus, as used herein, the word fuel shall include methanol and ethanol or combinations thereof and other carbonaceous substances and aqueous solutions thereof, that are amenable for use in direct oxidation fuel cells and fuel cell systems.

The fuel cell 200 includes a catalyzed membrane electrolyte 204, which may be a protonically conductive, electronically non-conductive membrane, sometimes referred to herein as a "PCM". As noted, one example of the material that may be used for the catalyzed membrane, which is commercially available is Nafion®, a registered trademark of E.I. Dupont de Nemours and Company, a cation exchange membrane based on a polyper-fluorosulfonic acid in a variety of thicknesses and equivalent weights. The membrane is typically coated on each of its major surfaces with an electrocatalyst such as platinum or a platinum/ruthenium mixture or alloyed particles. Thus, it is referred to herein as the "catalyzed membrane electrolyte." The catalyzed membrane electrolyte sandwich may be constructed according to any of the various available fabrication techniques, or other fabrication techniques, while still remaining within the scope of the present invention. One face of the catalyzed membrane electrolyte 204 is the anode face or anode aspect 206. The opposing face of the catalyzed membrane electrolyte 204 is on the cathode side and is herein referred as the cathode face or the cathode aspect 208 of the membrane electrolyte 204. The carbonaceous fuel substance, which in this instance is neat methanol, is introduced through an anode mass transport control layer 209, which is also referred to herein as a passive mass transport barrier, and in one embodiment of the invention, it is a methanol delivery film.

As shown in FIG. 2, the anode reaction is: $CH_3OH + H_2O = 6H^+ + 6\ e^- + CO_2$. In accordance with this reaction, one molecule of methanol and one molecule of water react at the anode face 206 of the membrane electrolyte 204, the result of which is that 6 protons ($6H^+$) cross through the membrane 204. This is made possible by the well-hydrated Nafion® substance of the membrane, which allows the protons to be carried via water across the membrane 204, as illustrated by the dashed arrow, 205. The electrons generated in the process, are conducted as illustrated by the dashed arrow 220 to the anode current collector 224 which is substantially open to allow fuel to be delivered to the catalyzed MEA assembly, which is connected via wires 230 and a load 232 to the cathode current collector 226. The carbon dioxide formed in the process (1) at the anode face 206 is (in the embodiment of FIG. 2), vented through the anode diffusion layer 210 out of the fuel cell as illustrated by the arrow 234.

On the cathode side, ambient air is introduced into the cathode portion via a cathode filter 290 and the cathode diffusion layer 240. The cathode diffusion layer is sometimes referred to herein as a "cathode backing layer." At the cathode aspect 208 of the membrane 204, the reaction is $4\ H^+ + 4\ e^- + O_2 = 2\ H_2O$. Thus, the protons and electrons combine with oxygen from the ambient air at the cathode face 208 to form water ($H_2O$).

In accordance with the invention, in order to maintain the optimal water distribution between the cell cathode 208 and cell anode 206 as required for optimal cell performance, a number of components can be included in a variety of combinations, as adapted for the particular fuel cell architecture. These water management components include a water management membrane and/or a microporous layer on the cathode side of the cell, a water management membrane and/or a microporous layer on the anode side, and an additional cathode filter layer on the exterior facing side of the cell.

More specifically, as illustrated in FIG. 2, a hydrophobic microporous layer 244 is disposed on the cathode side adjacent to the cathode aspect 208 of the membrane electrolyte 204. This microporous layer 244, which may be based on a hydrophobic material, or treated with a hydrophobic material, acts as a barrier against flow of liquid water produced on the cathode side 208 of the membrane electrolyte 204, in the direction of the arrow 250. The barrier also resists the water that is dragged by protons crossing the membrane 204 so that the liquid water cannot escape out of the cell through microporous layer 244 and, next, the cathode diffusion layer 240.

The microporous layer 244 blocks water in the cathode area and pushes the water which would have passed in the direction of the arrow 250 back across the membrane 204, in the direction of the arrow 254. This is due to a hydrostatic back-pressure created by hydrophobic capillary action of the microporous layer 244. To establish such hydrostatic pressure pushing water back from the cathode into the membrane, the capillary dimensions in the microporous layer have to be sub-micron and the capillary walls, hydrophobic. Accordingly, as liquid water is generated at cathode aspect 208 of the membrane electrolyte 204, it is blocked by the microporous layer 244 from traveling out of the cell, and the resulting build up of hydrostatic pressure at the cathode causes water to flow through the catalyzed membrane 204 in the direction of the arrow 254 toward the anode, where water is consumed according to Eq. 1.

It is advantageous to have good, uniform adherence between the layers in the catalyzed membrane electrolyte sandwich in order to achieve the desired water management herein. By way of example, and not of limitation, a robust bonding of the microporous layer can be achieved by hot-pressing the microporous layer 244 to the cathode aspect of the membrane electrolyte or the cathode diffusion layer 240. Alternatively, a substantially sustained adherence of the microporous layer 244 to the cathode aspect 208 (which may be the cathode diffusion layer 240) may be achieved by compression across the cell thickness dimension of over 50 PSI. To further assist in causing the water to cross the membrane from the cathode side to the anode side, the catalyzed membrane electrolyte 204 can be chosen to be sufficiently thin, to allow the rate of supply of water from the cathode side to the anode side to be enhanced. In accordance with one embodiment of the invention, the membrane electrolyte 204 is substantially comprised of a product that is commercially available as Nafion 112, sold by E.I. DuPont De Nemours and Company. Alternatives include thin composite membranes that are about 25 microns thick and that are sold by W.L. Gore Company. Use of such thin membranes in DMFCs, facilitating water transport, has not been recognized as possible to date because of the high rate of methanol permeation ("crossover") through such membranes in operation of ordinary DMFCs. However, when a controlled fuel delivery layer is used in the DMFC anode, fuel loss across the membrane is practically fully defined by the fuel transport control layer and, consequently, important advantages of thin membranes like Nafion 112 can be safely enjoyed.

In accordance with another aspect of the invention, the microporous layer 244 can be a free-standing water management membrane comprised substantially of expanded PTFE, optionally incorporating embedded carbon microparticles.

The water back-flow achieved by the microporous layer 244 keeps the Nafion® membrane hydrated and provides sufficient water availability to establish the 6 electron anode process and to maintain the local fuel concentration next to the anode surface 206 of the membrane 204 as low as required, This is evidenced by measured high fuel conversion to $CO_2$ in cells where anode water is provided exclusively by such back flow of water from the cathode across the membrane.

In order to further maintain the required water balance within the cell 200, another microporous layer 270 can be provided on the anode side, contiguous to the anode aspect 206 of the membrane electrolyte 204. This water management membrane, or microporous layer, may be comprised substantially of expanded PTFE, possibly filled with carbon microparticles. This layer 270 maintains water inside the anode aspect. Thus, the two layers together, i.e., the anode side water management layer 270 and the cathode side water management layer 244, effectively confine water between the anode aspect of the catalyzed membrane 206 and the cathode aspect of the catalyzed membrane 208, keeping the Nafion® membrane well hydrated and ensuring that the water content at the anode catalyst is sufficient to maintain the 6 electron process at the anode aspect 206 of the membrane electrolyte. Another requirement for effective push-back of water from the electrode into the membrane is good adhesion/bonding between layers 244 and 208, and 270 and 206. This is achieved by hot pressing together the stack of layers 240–210, preferably under controlled humidity conditions. Yet another requirement for effective push-back of water from the electrode into the membrane is significant mechanical compression across the thickness dimension of the cell, achieved by proper framing and bolting, or bonding. The compression has to exceed the pressure required to drive a sufficient flux of water through the membrane.

Another aspect of the water management feature of the present invention relates to the fuel cell being an air breathing cell. In an air breathing cell, the cathode side of the fuel cell is open to ambient air, to allow the oxygen into the cathode for the cathode reaction to proceed. The cathode backing, or diffusion layer 240 is usually comprised of a wet-proofed, porous carbon cloth that allows oxygen from the ambient air into the cell. However for cell operation where all the water is internally provided by back flow from the cathode, the porosity of typical cathode backings can result in excessive water evaporation loss. As such, water can be lost from the cathode at a rate determined by vapor transport through the cathode backing in the direction of the arrow 250. Liquid water generated at the cathode catalyst of the catalyzed membrane 204 equilibrates with water vapor at a vapor pressure determined by the inner temperature of the cathode, which is typically 5–10 degrees Celsius above the ambient temperature in an operating cell. The water vapor pressure defines a high side of a water vapor pressure gradient falling across the thickness dimension of the cathode backing layer, with the low side determined by the temperature and relative humidity of the ambient surrounding environment. Thus, a thicker cathode backing or a combination of two or more such layers can help lower the rate of water evaporation from the cell, maintaining sufficient water flow back to the anode. An example is the added layer designated as a cathode filter 290 (referred to hereinafter with reference to FIG. 4), which also serves to filter air impurities. It has also been found by us that a thicker backing layer or multiple backing layers do not degrade cell performance up to some total overall thickness, in that enough oxygen still enters the cathode portion of the fuel cell to maintain the design cell current.

In accordance with one embodiment of the invention, the cathode diffusion layer 240 material is E-Tek DS V2 backing, and the same is used as the additional cathode filter. Alternatively, instead of multiple backing layers to achieve the thickness required, to limit water vapor escape rate, it may be preferable in certain instances for the convenience of construction, to provide a single porous layer with suitable tortuosity and porosity to achieve the same barrier effect to the water vapor transport rate. In accordance with yet another aspect of the invention, a top layer of expanded PTFE 290 can be added to prevent liquid water from escaping, while still allowing oxygen to enter the cathode area of the fuel cell.

Accordingly, this unique management and control of the liquid water and water vapor of the present invention including pushing water back from the cathode into the membrane 204 by means of hydrophobic microporous layer 244 and curbing the rate of vapor escape through the cathode, achieved using a passive mode of operation, results in water distribution that enables the establishment of the 6 electron anode process and maintenance of the local methanol concentration next to the catalyzed anode surface of the membrane as low as 3% (1M), or below, which is the concentration level for the anode reaction to proceed at minimal methanol loss by cross-over.

Figure 3:
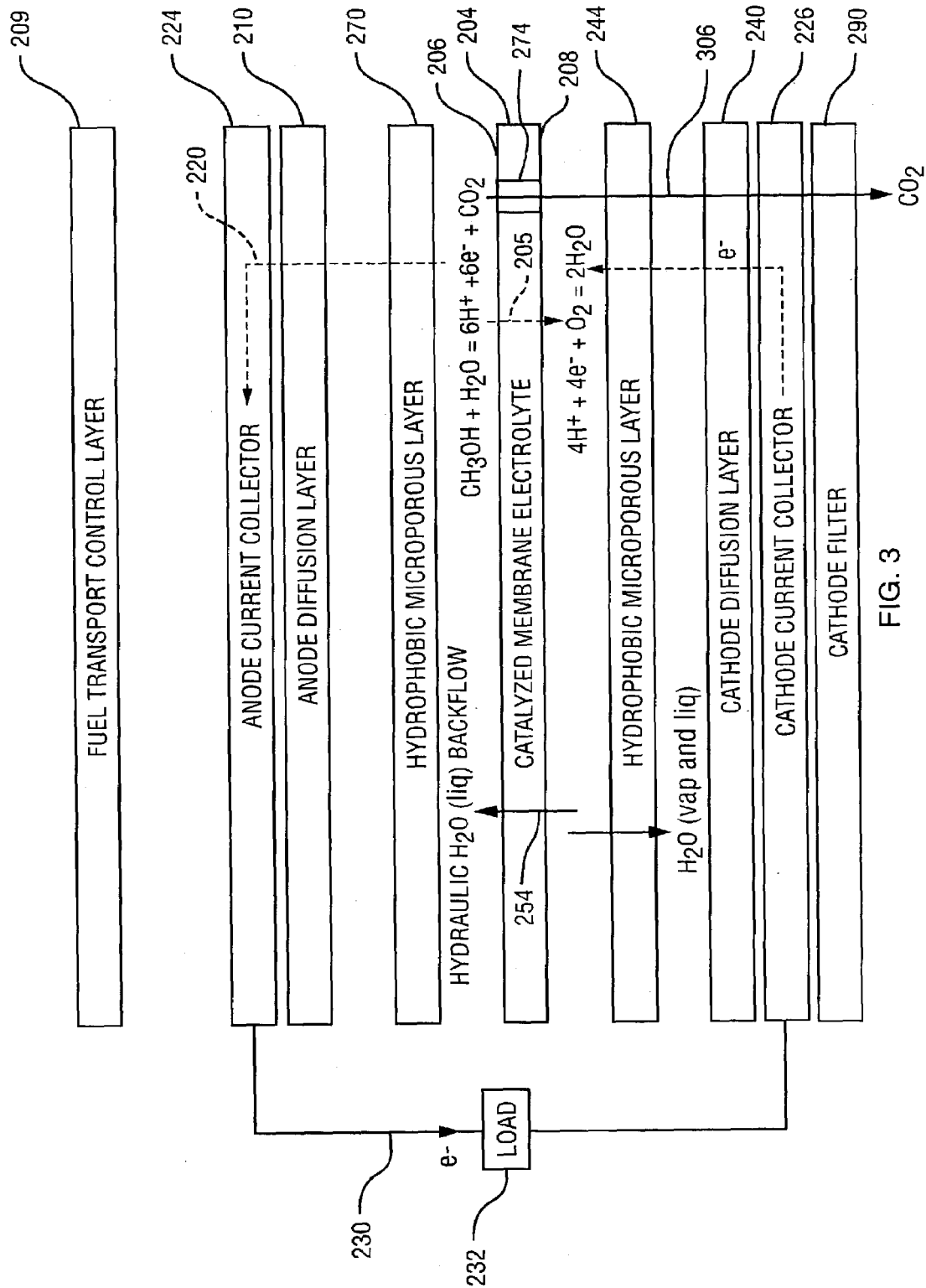
FIG. 3 is an alternative embodiment of the fuel cell of FIG. 2, in which carbon dioxide is driven through the membrane electrolyte.

FIG. 3 illustrates another embodiment of the fuel cell of FIG. 2 in which carbon dioxide is vented through the catalyzed membrane electrolyte 204 and out of the cell through the cathode side, as illustrated by the arrow 306. Carbon dioxide management will be discussed further hereinafter.

Fuel Delivery Management and Control

In order to allow the use of neat methanol, which has the advantages outlined above, the rate at which methanol is supplied to the anode must be controlled, preferably by a passive mass transport barrier element disposed between the fuel source and the anode aspect of the catalyzed membrane electrolyte. In one embodiment of the invention, the passive mass transport barrier is disposed in a plane that is generally parallel to the anode aspect of the membrane electrolyte. Preferably, the fuel feed from the fuel source, also referred to herein as the fuel reservoir, is a high concentration fuel, such as neat methanol, having substantially low or zero water content.

A methanol transport barrier element that defines a methanol flux at a level of 10–50% higher than the rate of anodic consumption of methanol should be provided. This flux, predetermined according to the cell current catalytically achievable near the design cell voltage at the relevant cell temperature, can be measured for a given barrier as the limiting current of the cell. This can be accomplished using one of a number of techniques.

Based on the catalytic activity of state-of-the-art DMFC electrodes, the supply rate of methanol should be controlled by such a barrier, such that a limiting current density on the order of 100–200 mA/Cm$^2$ is achieved at internal cell temperature of 30–40 deg. C. A proper anode transport barrier introduced to allow the use of neat methanol feed with state of the art DMFCs, should allow methanol flux corresponding to this range of current densities. More specifically, the rate of fuel delivery by the passive mass transport barrier of the present invention is a defined rate that is calculated with reference to design cell current. The supply rate of fuel is controlled to correspond to a current density in anodic oxidation of methanol in the range of 100–200 mA/cm$^2$, at DMFC operation temperature in the range of 30–40 deg. C. The more exact rate of fuel delivery by the passive mass transport barrier, corresponds to the rate of fuel consumption by the fuel cell, determined by the design cell current, multiplied by a factor of between 1.0 and 1.5. Since at higher cell operation temperatures the cell currents are higher, the supply rate of fuel through the transport barrier will be correspondingly adjusted to higher value, for example by using a thinner barrier layer of similar composition and structure, always conforming to the relationship: Controlled flux through transport barrier=flux consumed at cell anode×(1.0–1.5)

A low porosity layer such as that defined in commonly assigned U.S. patent application Ser. No. 10/262,167 filed on Oct. 1, 2002, entitled ANODE DIFFUSION LAYER, can be employed as layer 209 in FIGS. 2 and 3. Such microporous layer includes perforations that are typically pores having a diameter ranging from 0.01µ and 100µ. The perforations deliver and direct the fuel to the catalyzed anode aspect of the membrane at an appropriate rate while substantially resisting carbon dioxide from flowing back into the fuel chamber. This component may also be comprised of a solid porous plug having a pore network that provides for a capillary-force-controlled flow of fuel at the defined rate.

Figure 4:
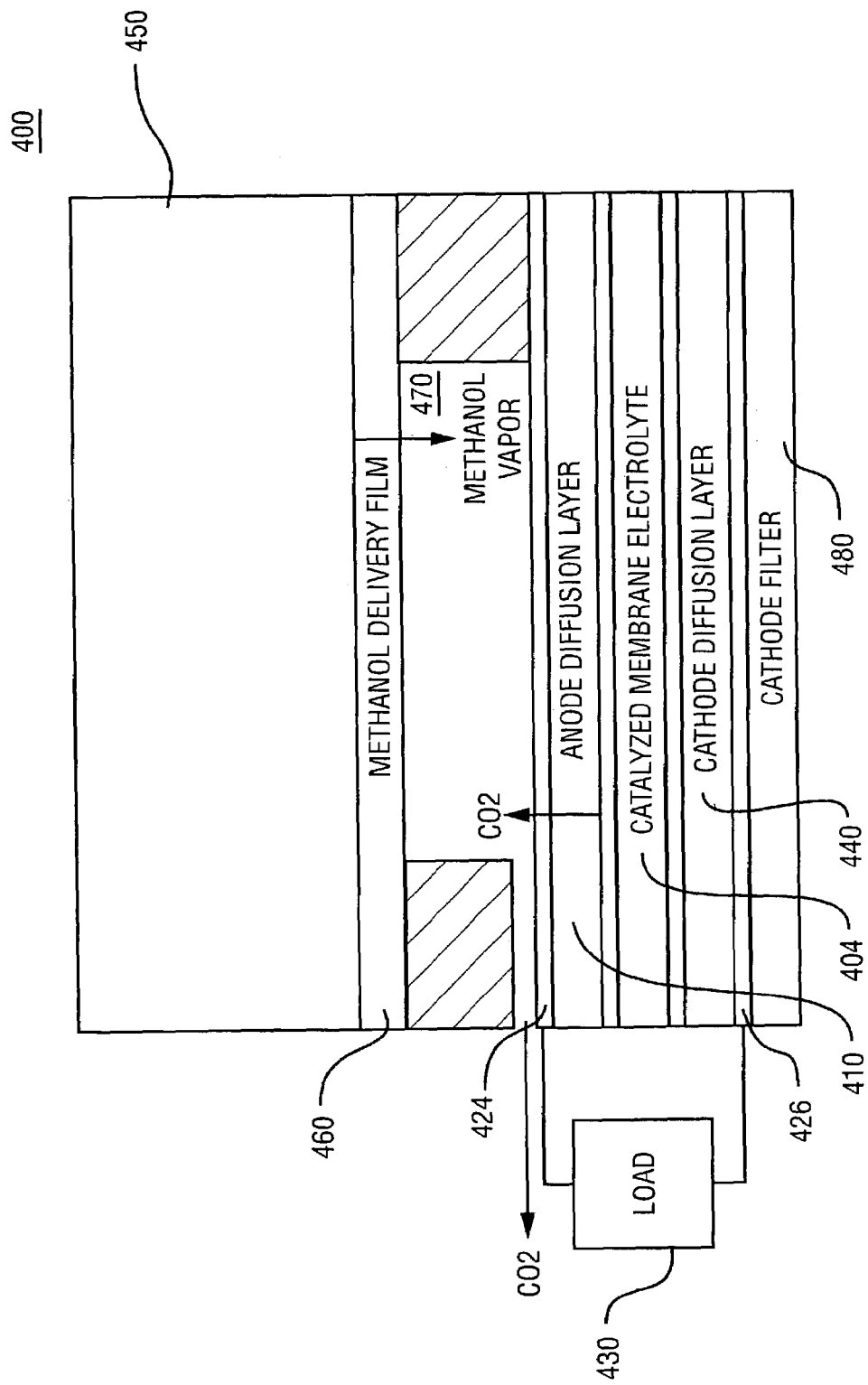
FIG. 4 is a cross-sectional view of the fuel cell system in accordance with the present invention including the methanol delivery film, and in which carbon dioxide is routed out of the anode vapor chamber.

In accordance with the present invention, a methanol vapor delivery film can instead be used for layer 209 in FIGS. 2 and 3, to deliver fuel to the anode aspect at the appropriate rate. Referring now to FIG. 4, a cross section of a fuel cell system 400, in accordance with the present invention, which includes a methanol vapor delivery film is illustrated. The catalyzed membrane electrolyte 404 is sandwiched between an anode diffusion layer 410 and a cathode diffusion layer 440. The current collected is passed through load 430, which is coupled across anode current collector 424 and cathode current collector 426. A fuel reservoir 450, which may be a separate or detachable fuel cartridge, or may be a part of the fuel cell itself, stores a methanol fuel solution, which is preferably 50% methanol or greater, and most preferably neat methanol, for supplying the fuel cell. The methanol delivery film 460 of the present invention is a membrane that is placed as one wall of the fuel reservoir 450.

This methanol delivery film 460 acts as a fuel delivery barrier between the concentrated, or neat methanol source in the fuel reservoir 450 and the membrane electrolyte 404. More specifically, the methanol delivery film 460 limits the rate of the methanol supplied to the anode aspect of the membrane electrolyte 404 presenting a transport barrier while effecting a phase change from liquid methanol in the fuel reservoir 450 to methanol vapor in the vapor chamber 470, shown in FIG. 4. In accordance with one embodiment of the invention, the methanol delivery film is a single layer of a thin polymeric film that is placed between the concentrated, or neat methanol source and anode side of the membrane electrolyte. Addition of another membrane on top of that single layer or surface modification of the single membrane can be also applied to control transport rate and improve transport selectivity (methanol outflow from the reservoir vs. water inflow from the cell). This thin film may be a pervaportion membrane, or other suitable membrane, that effects a phase change from liquid methanol in the fuel reservoir 450 to methanol vapor in the methanol vapor chamber 470.

Another important advantage reached with the use of such a vapor delivery membrane, is the orientation independent seal of methanol liquid in the reservoir and yet another important advantage, is the ability to achieve orientation independent rate of fuel delivery through the vapor delivery membrane. The latter feature can be achieved by coating the inner walls of the reservoir by a thin hydrophilic porous layer, such layer being always in contact along at least one wall with the liquid fuel in the reservoir. Wicking of the fuel along such internal porous coating, ensures continuous coverage of the inner surface of the fuel delivery film by liquid fuel irrespective of orientation, thereby ensuring fuel delivery rate through 460 which is independent of orientation.

Figure 5:
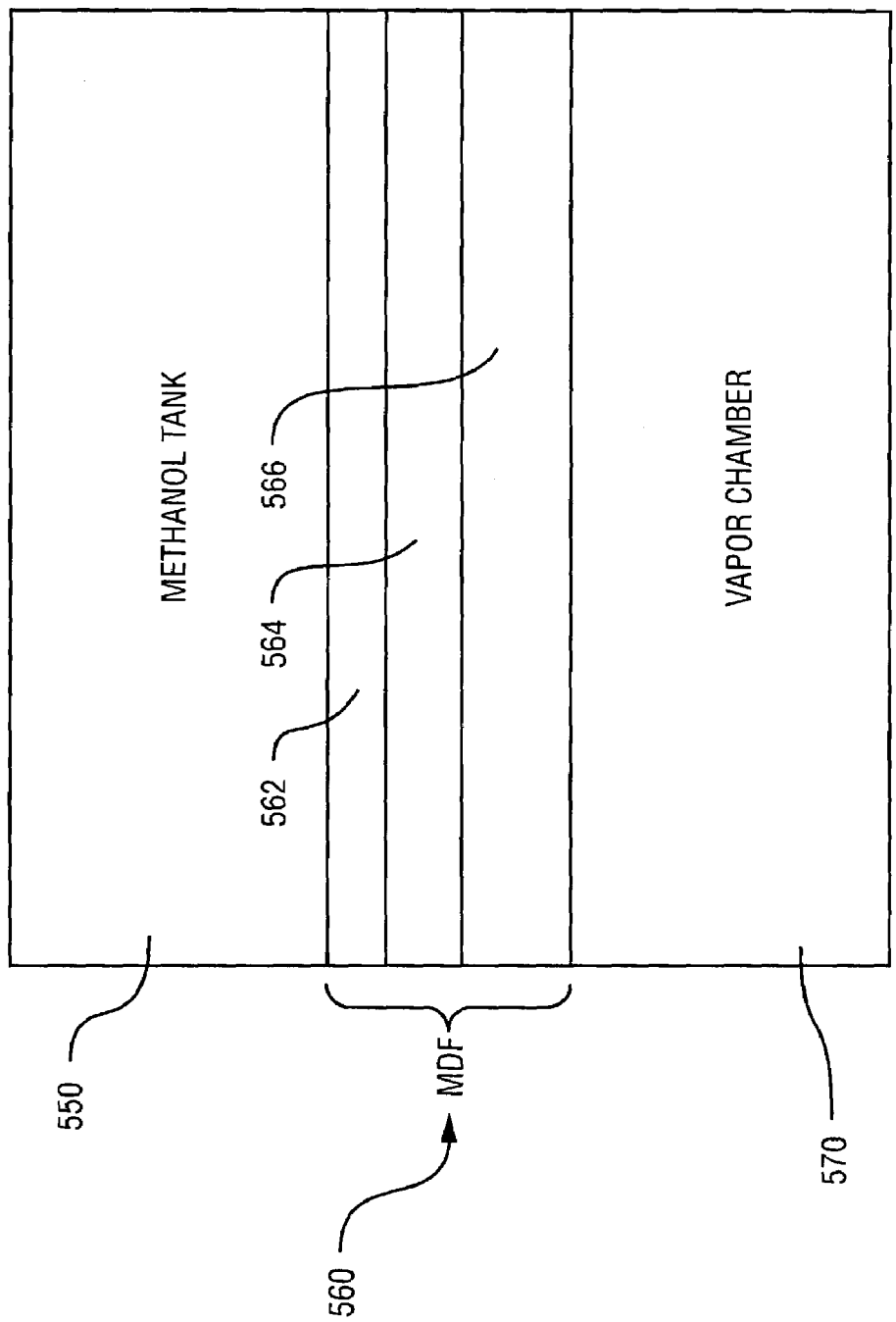
FIG. 5 is a schematic illustration providing further details of the composition of the methanol delivery film of the fuel cell of the present invention that acts as a fuel delivery barrier between a concentrated methanol source and the anode face of the membrane electrolyte.

As illustrated in FIG. 5, a gap 570 between the fuel delivery film 560 and the anode aspect of the membrane electrolyte, defines a vapor chamber containing vapor and gas. The vapor gap would contain some liquid as well, but will not be filled with liquid. This gap is also illustrated in FIG. 4 as the vapor chamber 470. FIG. 5 also highlights some details of the fuel delivery film 560, revealing that this could be a multilayered film. Fuel delivery film is disposed between fuel tank 550 and vapor gap 570. In a case of a pervaporation film, layer 564 could be a non-porous thin film of silicone (e.g., 10–50 micrometer thick), supported on a porous support rendering mechanical stability 562. The top layer, 566, may be added to modify the surface properties of the silicone film, e.g., to make the surface more hydrophobic as desired in a particular embodiment.

Figure 6:
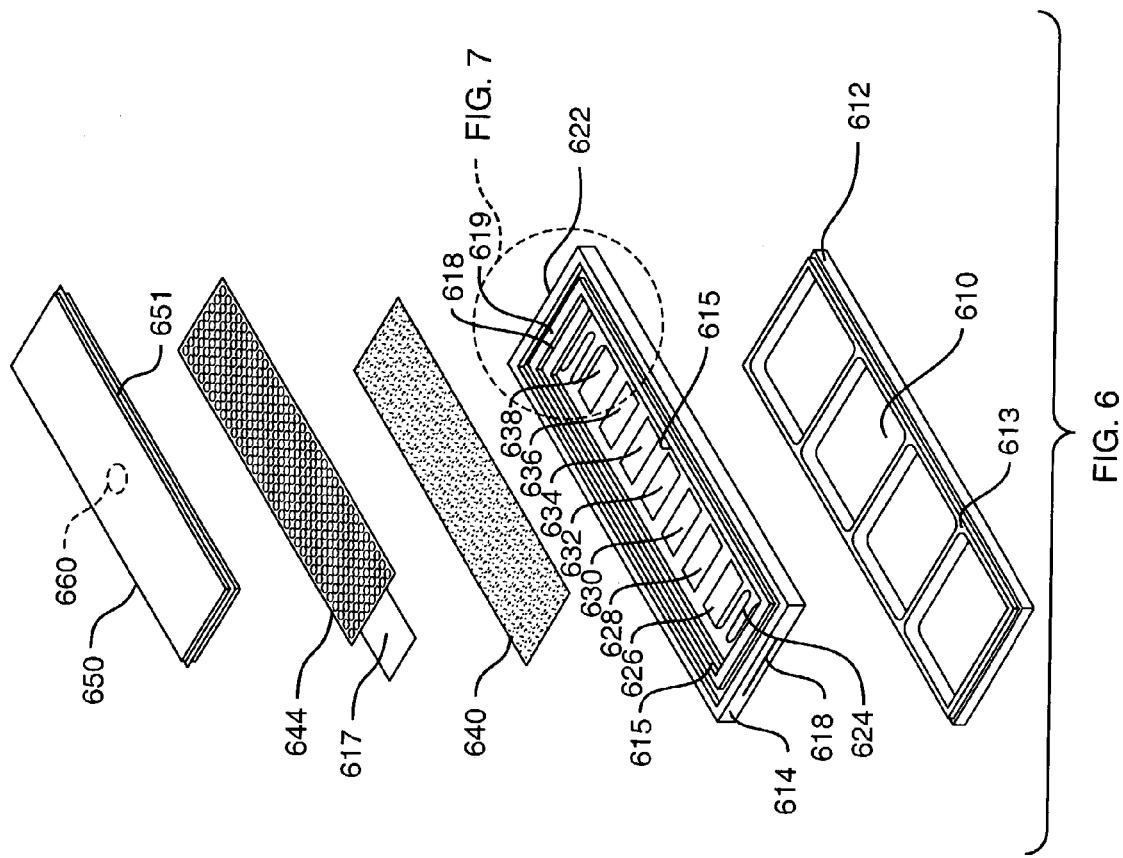
FIG. 6 is an exploded perspective illustration of the anode portion of one embodiment of the fuel cell system of the present invention illustrating a frame for holding the methanol delivery film and the water management layer.

The methanol delivery film can be disposed on a plastic frame, located within a larger system frame in the fuel cell. More specifically, this is depicted in FIG. 6 which is an exploded isometric illustration of the anode portion of one embodiment of the fuel cell system of the present invention. The methanol delivery film 610, which has been described herein with reference to fuel delivery control is sealed onto a methanol delivery film frame 612. The methanol delivery film frame 612 provides physical support to film 610, and the frame 612 has openings or windows therein allowing maximum open surface area of film for the fuel from the fuel tank (not shown) to be vaporized and pass into the vapor chamber. The frame 612 is preferably a plastic substance that does not react substantially with methanol. The methanol delivery film 610 in the frame 612 can be sized to supply one fuel cell, or if several fuel cells are placed side by side, a single sheet of film can be used to supply multiple fuel cells as may be desired in a particular application while remaining within the scope of the present invention. It is also within the scope of the present invention to include additional fuel delivery tools including one or more fuel injectors for spraying fuel onto the anode aspect of the catalyzed membrane electrolyte or into the anode chamber. In accordance with another aspect of the invention, there may be applications in which fuel delivery can be further controlled by heating liquid fuel in the fuel reservoir using catalytic combustion or electric heating for enhanced delivery to the anode chamber.

The methanol delivery film frame 612 has a rectangular rim 613 onto which a system frame 614 is placed to provide structural support to the various components of the system.

Carbon Dioxide Management

Another substance that must be managed in order to produce optimum direct methanol fuel cell performance is carbon dioxide produced in the anode reaction. In prior art designs, the gaseous carbon dioxide produced in the electricity-generating reaction at the anode typically travels away from the catalyzed surface of the membrane through the anode diffusion layer and ultimately into the anode chamber that contains the fuel supply. This can interfere with liquid fuel access to the anode aspect of the membrane. Thus, it is preferred to direct the anodically-generated carbon dioxide out of the anode chamber prior to its entering the anode compartment. In U.S. patent application Ser. No. 10/262,167 referenced herein, an anode diffusion layer is described that includes conduits or channels on the surface adjacent the anode catalyst, that provide preferential flow paths for carbon dioxide to be laterally directed away from the catalyzed membrane and out the side wall of the anode chamber, such that it does not travel out through the diffusion layer into the anode chamber of the fuel cell.

Several other techniques for removing carbon dioxide are provided here. The first is best understood with reference to FIGS. 6 and 7. By way of background, carbon dioxide that is generated at the anode side of the membrane electrode assembly 650 may collect in the methanol vapor chamber leading to excessive buildup of $CO_2$ pressure that can potentially impede cell performance. In accordance with the invention, at least one gas exit port is provided in the anode chamber. Gaseous anode products are released directly to the ambient environment through gas exit ports, and the gas exit ports are preferably located in close proximity to the anode aspect of the catalyzed membrane. In the illustrative embodiment, the gas exit port is in the form of a $CO_2$ router device 620 (FIG. 6) that includes two $CO_2$ escape vents 622 and 624, router device 620 is placed within the anode portion of the fuel cell. The router device 620 directs carbon dioxide across the windows 626 through 638, and into the $CO_2$ escape vents 622 and 624 which can be straight channels, serpentine channels, or can take other configurations as desired in a particular application.

The $CO_2$ router device 620 is held by the system frame 614. In accordance with the embodiment illustrated in FIGS. 6 and 7, the system frame 614 has a series of flanges into which the components of the cell fit securely and are thereby held in place. For example, the $CO_2$ router 620 rests on a flange in the recess 615 in the frame. Next, an EPTFE water management membrane 640 is placed directly on top of the router 620. The next component, the anode current collector 644 has a notch 617, which fits in the slot 618, and the current collector 644 rests on the flange 618 in the system frame 614. A raised platform 619 is created by the router 620 and provides support for the MEA 650 and defines a vapor chamber for the flow of fuel to the anode diffusion layer, and, ultimately to the anode aspect 651 of the catalyzed membrane.

Figure 7:
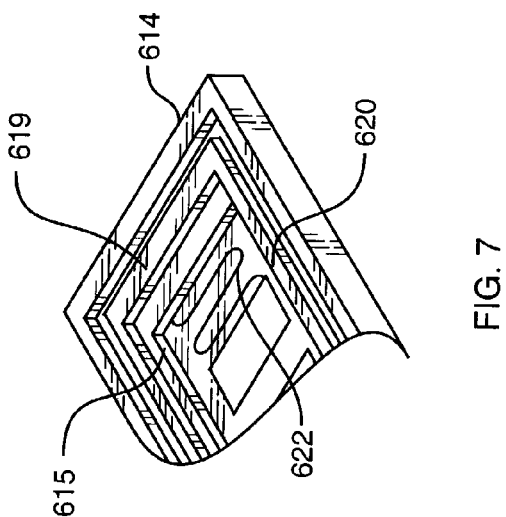
FIG. 7 is an enlarged detail of the carbon dioxide router of the anode portion of the fuel cell system of FIG. 6.

The $CO_2$ router device 620 is shown in greater detail in FIG. 7, which is an enlarged section of the carbon dioxide router 620, and the system frame 614 that supports it. The escape route 620 may be of a serpentine shape, as illustrated, or may be a straight channel. And, the router may include multiple channels along its periphery in addition to the two shown while remaining within the scope of the present invention.

The inventive $CO_2$ escape router device 620 manages carbon dioxide by directing it out of the cell via the channel leading to the surrounding atmosphere. This results in effective removal of carbon dioxide, but at the same time, no significant methanol loss or emission is allowed through the carbon dioxide escape routes. In accordance with another aspect of the invention, one or more pin holes in the catalyzed membrane electrolyte can allow for carbon dioxide to escape through the membrane into the cathode side, and then to travel out through the cathode filter. A pinhole 660 is illustrated in phantom in FIG. 6.

Figure 8:
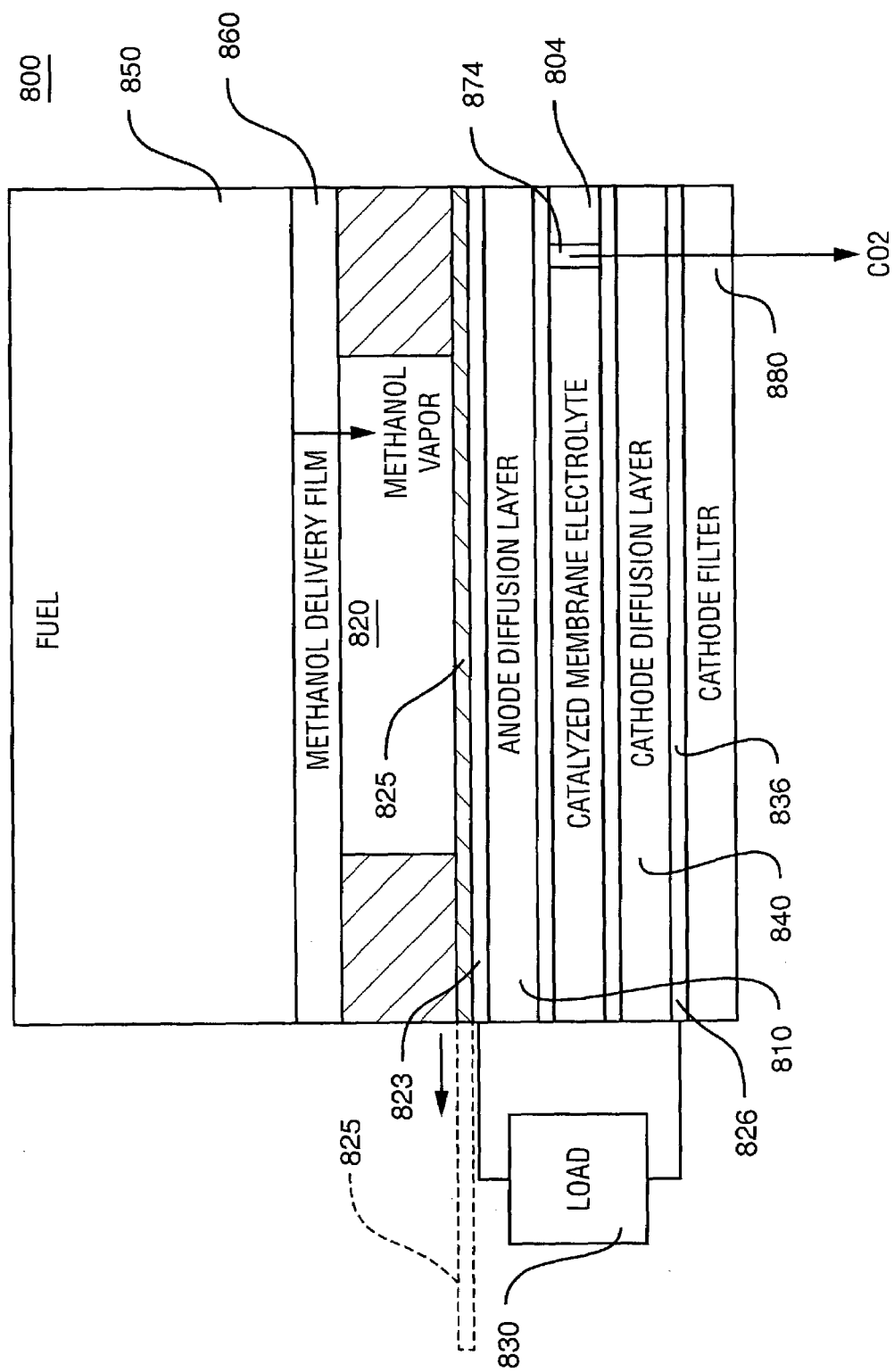
FIG. 8 is a cross-sectional view of the fuel cell system in accordance with the present invention in which carbon dioxide is directed out through conduits in the membrane electrolyte.

Another method of managing carbon dioxide was described in commonly-owned U.S. Patent Application Publication No. 2002/0102451 A1 for a FUEL CELL MEMBRANE AND FUEL CELL SYSTEM WITH INTEGRATED GAS SEPARATION, which is incorporated by reference herein. In accordance that description, carbon dioxide can be directed through conduits across the thickness of the membrane electrolyte itself. For convenience of reference, this feature is illustrated in FIG. 8. The direct oxidation fuel cell 800 of FIG. 8 includes catalyzed membrane electrolyte 804 and anode diffusion layer 810 and cathode diffusion layer 840. Current collector plates 823 and 826 are connected by a load 830 for collecting the electricity generated by the cell. Fuel, of preferably 50% methanol or greater, is contained in the fuel reservoir 850 and it passes through methanol delivery film 860 in the manner hereinbefore described and undergoes a phase change to the form of methanol vapor and is contained in methanol vapor chamber 820 from which chamber it is supplied to the anode. This methanol vapor is presented to the anode aspect of the catalyzed membrane electrolyte to produce the electricity of the reaction.

In certain applications, it may be desirable to provide an adjustable shutter 825 in the fuel cell, which can be opened as shown in phantom in FIG. 8, to allow fuel to be delivered at variable, controlled rates through the methanol delivery film 860. The adjustable shutter 825 may be also completely closed, as shown in solid lines in FIG. 8, to block the flow of vaporous fuel from the methanol delivery film 860, and thus preventing fuel from travelling to the anode diffusion layer and ultimately to the anode aspect of the catalyzed membrane electrolyte. This is described in further detail in a commonly-assigned United States Patent Application, of Hirsch et al, entitled VAPOR FEED FUEL CELL SYSTEM WITH CONTROLLABLE FUEL DELIVERY," which is being filed on even date herewith.

The carbon dioxide produced in the anodic reaction travels through a carbon dioxide channel 874, then passes through the cathode diffusion layer 840 and exists through the cathode filter 880 without interfering with the anodic reaction.

A single, direct methanol fuel cell was fabricated as follows. A 112 Nafion membrane (50 micrometers thick), was catalyzed by applying a PtRu catalyst layer for anode aspect and Pt catalyst for cathode aspect of the membrane, employing well documented "catalyst ink" application methods. A pair of E-Tek backing layers were hot-pressed in a humidified chamber onto each side of the catalyzed membrane, ensuring good, uniform adherence of the microporous layer on the surface of the backing layer adjacent the catalyzed membrane, to the catalyzed surface of the membrane. Stainless steel metal hardware was used to frame the cell. The cell was mounted so as to expose the cathode electrode external backing layer to air to allow air breathing by the cathode, however additional thin layers of expanded PTFE were used as cathode filters, to curb evaporative water loss.

A single, direct methanol fuel cell was fabricated as follows. 10 cc of neat (100%) methanol were then added to the anode compartment and a methanol delivery control film, a silicone (PDMS) membrane 125 micrometer thick, was inserted so as to cap the neat methanol liquid in the anode. $J_{lim}$ for methanol delivery through this silicone film, was determined separately as 150 mA/cm². On insertion of methanol together with the methanol delivery film, the cell current at 0.3V rose to 120–130 mA/cm² and after 30 hours of continuous operation in completely stationary, passive mode, i.e., by air breathing and with no manipulation of either methanol or water, the current dropped to 100 mA/cm². Energy and mass balances after 45 hours of continuous operation revealed average power for the complete run of 29.5 mW per cm² of active membrane area and 0.85 Wh per cc of methanol fuel inserted initially into the anode compartment, corresponding to fuel utilization of 71.5% based on complete oxidation of methanol to $CO_2$.

Figure 9:
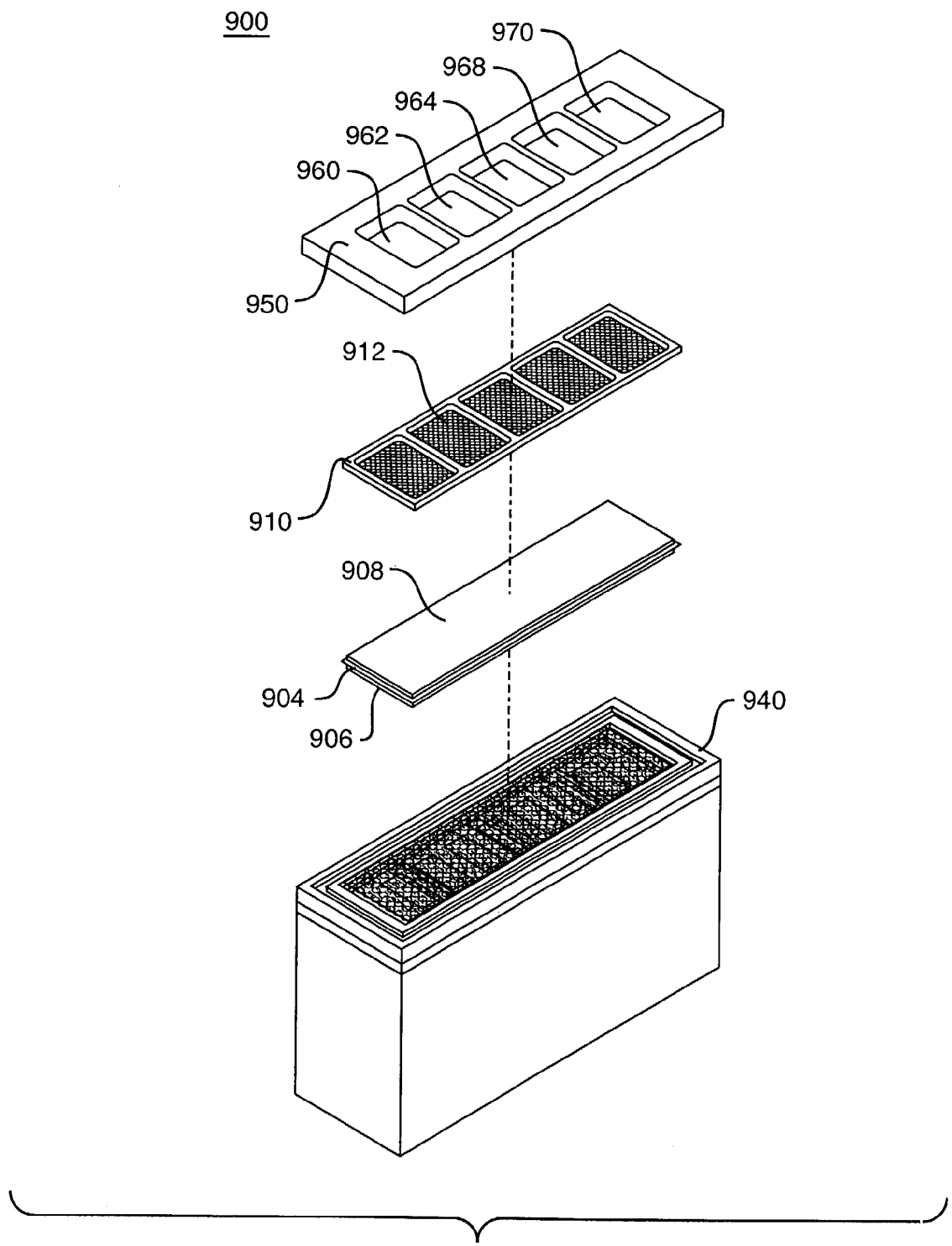
FIG. 9 is an exploded perspective illustration of the cathode portion of one embodiment of the fuel cell system of the present invention.

To further complete the description of the fuel cell system of the present invention, an exploded illustration from a cathode perspective is provided in FIG. 9. The fuel cell system 900 includes the MEA assembly 904, which has an anode side 906 and a cathode side 908. The MEA comprises the cata-lyzed membrane electrolyte and the anode and cathode diffusion layers described herein with respect to the other figures. Sandwiched next to the cathode side 908 of the MEA 904 is a cathode compression frame 910. Welded to the cathode compression frame in the embodiment illustrated in FIG. 9 is the cathode current collector, which is a highly conductive wire mesh with low resistance. The cathode current collector 912 may be, in other applications, a separate component not necessarily welded to the cathode compression frame 910. The cathode compression frame is pressed down onto the MEA assembly, which in turn, sits in the system frame 940. The cathode compression frame provides and maintains good contact between the various components of the MEA and ensures structural integrity.

This frame also contributes to the maintenance of hydrostatic pressure that pushes liquid water from the cathode backing through the membrane electrolyte to the anode in the manner described with respect to FIG. 2. A cell assembly top plate 950 is then used to compressively maintain the components within the fuel cell. As can be seen from FIG. 9, the cell assembly top plate 950 has openings 960–970. This allows the cell to be an air breathing cell. Oxygen from the ambient air will diffuse through these openings through the cathode compression frame 910 and to the cathode side 908 of the MEA assembly 904, supplying the cathode half reaction needed for operation of the fuel cell. The cathode filter (not shown in FIG. 9), illustrated as 880 in FIG. 8 limits cathode water evaporation rate and resists any impurities in the ambient air from entering into the cell, but allows sufficient oxygen to enter the cell and further allows carbon dioxide to exit the cell in the embodiment of FIG. 9.

In operation, the fuel cell system of the present invention will be described with reference to the exploded system assembly illustration of FIG. 10. The system includes a neat methanol (or other fuel substance) to be provided in fuel tank assembly 1002. This fuel undergoes a phase change when it passes through the methanol delivery film 1004. It is noted that a single methanol delivery film component 1004 may be placed across an array of suitably connected fuel cell in accordance with the present invention. In such a case, the fuel cell array could be fastened together and compresses under the frame 1006. Alternatively, a plurality of fuel cells in accordance with the present invention can be arranged in a bipolar fuel cell stack, in a manner that will be understood by those skilled in the art.

Whether in a single fuel cell, an array of fuel cells, or in a fuel cell stack, the methanol vapor enters a vapor chamber, which is defined between the methanol delivery film 1004 and the anode current collector 1014. The methanol delivery film is designed to generate a methanol vapor flux into the vapor chamber required to reach the maximum cell current achievable from the MEA at the design temperatures multiplied by a factor of 1.0 to 2.0. The methanol vapor passes through an optional ePTFE water management membrane 1012, the anode current collector 1014 and the anode diffusion layer. The anode reaction, proceeds to produce carbon dioxide, 6 protons and 6 electrons. The carbon dioxide in the embodiment shown in FIG. 10 travels back through the anode current collector 1014 to the $CO_2$ router device 1010, and the $CO_2$ is directed through the openings of the router and travels through the serpentine paths 1011 and 1013 and out of the fuel cell system assembly. The protons cross the protonically-conductive membrane of the MEA assembly 1020 and this is aided by the water supplied by back pressure provided by the microporous layer at the cathode assisted in turn by the compression across the cell, such re-routing of the water from the cathode into the membrane maintaining the Nafion® membrane in a well-hydrated state. The electrons produced in the anodic reaction are collected in the anode current collector 1014, which is connected across a load (not shown) to the cathode current collector 1022.

Figure 10:
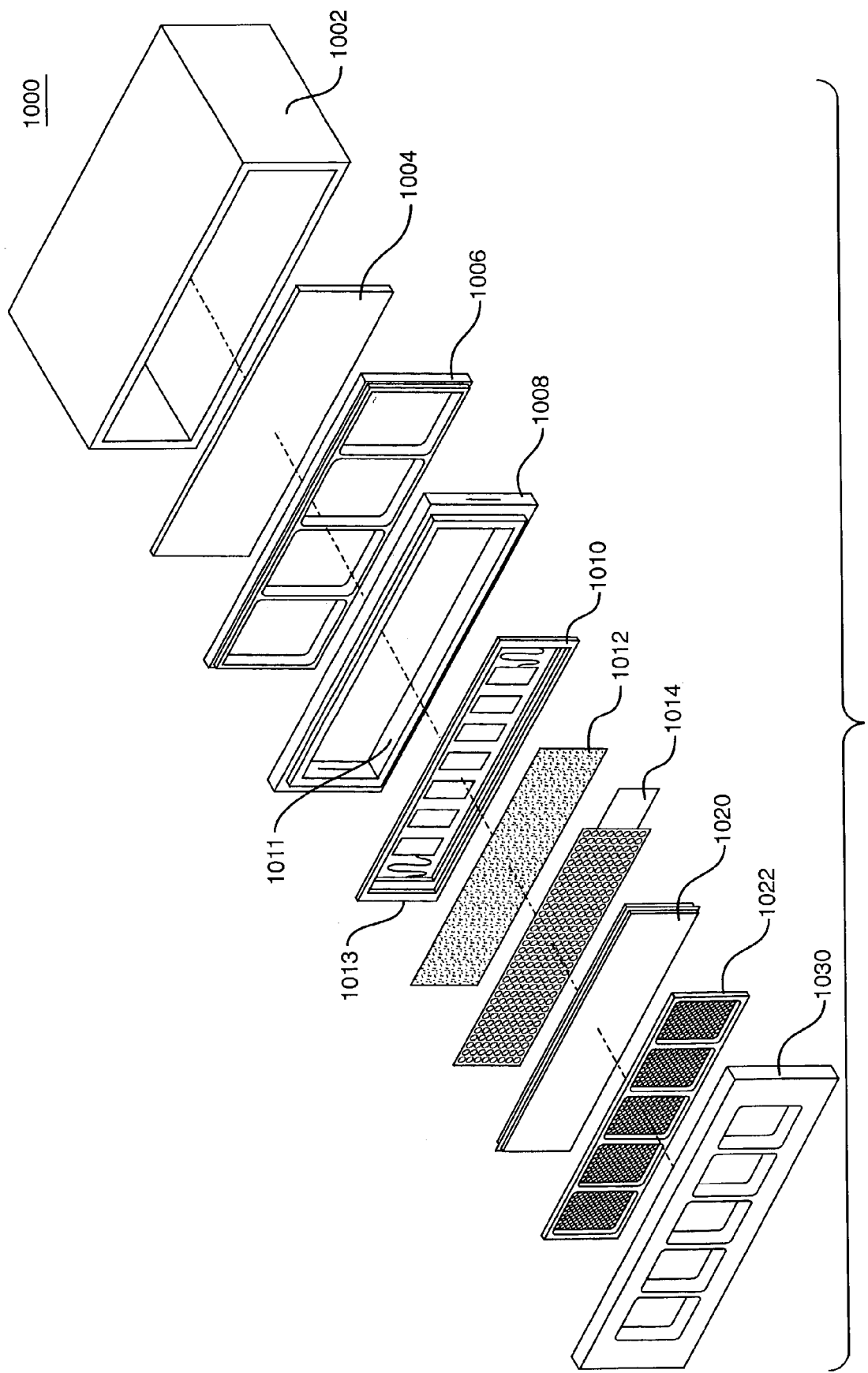
FIG. 10 is an exploded overall system assembly illustration of one embodiment of the fuel cell system of the present invention.

The cathode current collector 1022 is in the embodiment of FIG. 10 combined with compression frame assembly. The compression frame assembly, as noted with respect to FIG. 9, maintains the cathode components under pressure in order to keep water produced in the cathodic reaction within the cell and provide it for the anode process, as described herein. The cell assembly top plate 1030 holds all of the components in the appropriate position in the system frame 1008 that is fastened to the fuel tank assembly 1002. Thus, water, produced at the cathode, is maintained within the catalyzed membrane to create the appropriate hydration for the Nafion® membrane and to keep water available for the anodic reaction. Optional cathode filter (not shown) may be disposed between assembly top plate 1030 and cathode current collector 1022.

This, in combination with the control of the rate of methanol delivery allows the use of neat methanol in the fuel tank as the fuel source. Thus, the hitherto assumed need of water in a direct methanol fuel cell system to be either carried, or collected and pumped externally from cathode back to anode, is eliminated. The system herein described was shown by us to exhibit utilization of 80% of neat methanol fuel stored in the fuel tank based on the electric charge expected in the complete oxidation, 6 electron process set forth in equation (1), while maintaining a power density in the range of 20–30 mW per $cm^2$ of PCM area in a cell operating near 35 deg. C. Accordingly, a highly efficient microfuel cell has been reduced to practice, that has a reduced size and volume due to the elimination of the need to either carry water or return it from cathode by external pumping and neither air blowing is required to achieve the above mentioned performance. The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A direct oxidation fuel cell, comprising:
   (A) a membrane, sufficiently thin to allowe a rate of internal supply of water from a cathode side to an anode side of the fuel cell to be enhanced, said membrane intimately interfacing with a catalyst layer along each of said membrane's major surfaces, having an anode aspect and a cathode aspect;
   (B) a fuel cell housing enclosing said fuel cell;
   (C) a fuel chamber in fluid communication with said anode aspect, said fuel chamber having no liquid outlet, and being filled or fed with fuel and said fuel chamber having a passive mass transport barrier that is configured to defines a rate of fuel delivery of about 10-50% higher than a rate of anodic consumption of methanol in the fuel cell; and
   (D) effective water supply from cathode to anode within said fuel supply, so that water management in said fuel cell is achieved without water transport from cathode to anode external to the active volume of the fuel cell.

2. The direct oxidation fuel cell as defined in claim 1 wherein the fuel is neat methanol having substantially zero water content.

3. The direct oxidation fuel cell as defined in claim 1 wherein said passive mass transport barrier is disposed in a plane that is generally parallel to that of the anode aspect.

4. The direct oxidation fuel cell as defined in claim 1 wherein said rate of fuel delivery by said passive mass transport barrier is a defined rate calculated with reference to design cell current.

5. The direct oxidation fuel cell as defined in claim 4 wherein said de-fined rate is calculated such that fuel delivery is controlled to achieve a limiting current density on the order of one of the following:
   about 100–200 $mA/cm^2$ at cell operation temperature of about 30–40 deg.C.;
   on the order of about 150–300 $mA/cm^2$ at cell operation temperature of about 40–60 deg.C. and
   about 200–400 $mA/cm^2$ at cell operation temperature of 60–80 deg.C.

6. The direct oxidation fuel cell as defined in claim 4 wherein said rate of fuel delivery by said passive mass transport barrier corresponds to a rate of fuel consumption by the fuel cell, as gauged by the design cell current at a design point of operation, multiplied by a factor of between about 1.1 and 1.5.

7. The direct oxidation fuel cell as defined in claim 1 wherein said passive mass transport barrier is a pervaporation fuel delivery membrane that effects a phase change such that liquid fuel on transporting through said fuel delivery membrane is converted to a vaporous fuel.

8. The direct oxidation fuel cell as defined in claim 7 wherein said fuel delivery membrane effects a vapor delivery rate, as gauged by a design cell current at a design point of operation multiplied by a factor of between about 1.1 and 1.5.

9. The direct oxidation fuel cell as defined in claim 7 wherein a vapor chamber is defined in a gap between said fuel delivery membrane and said anode aspect of the membrane, said vapor chamber maintaining a significant fraction of it's volume free of liquid.

10. The direct oxidation fuel cell as defined in claim 1 wherein said passive mass transport barrier is a microporous structure having perforations that deliver and direct liquid fuel to the anode aspect of the membrane at a defined rate.

11. The direct oxidation fuel cell as defined in claim 10, wherein said microporous structure is disposed in a plane that is generally parallel to that of the anode aspect.

12. The direct oxidation fuel cell as defined in claim 1 wherein said passive mass transport barrier is a solid porous plug having a pore network that provides for a capillary-force-controlled flow of fuel at the defined rate.

13. The direct oxidation fuel cell as defined in claim 1 wherein said fuel is up to 100% methanol.

14. The direct oxidation fuel cell as defined in claim 1 further comprising at least one gas exit port defined in said anode chamber such that gaseous anode products are released directly to the ambient environment, and said gas exit port being located in close proximity to said anode aspect of the catalyzed membrane.

15. The direct oxidation fuel cell as defined in claim 14 wherein said gas exit port is a vent in a carbon dioxide router device.

16. The direct oxidation fuel cell as defined in claim 1 wherein water generated in a reaction at the cathode aspect of the membrane is supplied back from a cathode to anode side of said fuel cell at rate sufficient to provide an amount of water that is required for substantially complete anodic oxidation of fuel at the highest cell current capable.

17. The direct oxidation fuel cell as defined in claim 16 further comprising a wet-proofed cathode backing disposed in the cathode chamber, and a hydrophobic microporous layer, being substantially comprised of expanded PTFE, disposed generally between the cathode backing and the cathode aspect of the membrane, to enhance the rate of supply of water back from the cathode side of the fuel cell to the anode side of the fuel cell.

18. The direct oxidation fuel cell as defined in claim 17 wherein said microporous layer is robust bonded to the cathode aspect by hot-pressing under controlled humidity conditions.

19. The direct oxidation fuel cell as defined in claim 17 wherein said microporous layer is secured to said cathode aspect of the membrane by compression across the cell thickness dimension of over 50 PSI, to establish substantially sustained adherence.

20. The direct oxidation fuel cell as defined in claim 17 wherein said microporous layer that is comprised substantially of expanded PTFE also includes embedded carbon microparticles.

21. The direct oxidation fuel cell as defined in claim 17 wherein said hydrophobic microporous layer is deposited directly onto the wet-proofed cathode backing.

22. The direct oxidation fuel cell as defined in claim 1 wherein said catalyzed membrane is sufficiently thin to allow the rate of internal supply of water from the cathode side to the anode side to be enhanced.

23. The direct oxidation fuel cell as defined in claim 22 wherein said membrane is substantially comprised of polyperfluorosulfonic acid.

24. The direct oxidation fuel cell as defined in claim 1 further comprising one or more layer components being disposed generally adjacent a cathode backing layer in an exterior portion of said cathode chamber that faces the ambient environment to control water loss, primarily in vapor form, from the cathode chamber.

25. The direct oxidation fuel cell as defined in claim 24 wherein one or more of said layer components is substantially porous.

26. The direct oxidation fuel cell as defined in claim 24 wherein one or more of said layer components is substantially hydrophobic, or has combined, hydrophilic/hydrophobic characteristics.

27. The direct oxidation fuel cell as defined in claim 1 further comprising a one or more layer components being disposed generally in said anode chamber to control water loss from said membrane through the anode aspect of the membrane.

28. The direct oxidation fuel cell as defined in claim 27 wherein said component in said anode chamber is a microporous layer that is comprised substantially of expanded PTFE.

29. The direct oxidation fuel cell as defined in claim 28 wherein said microporous layer that is comprised substantially of expanded PTFE, also includes embedded carbon microparticles.

30. The direct oxidation fuel cell as defined in claim 1 further comprising additional fuel delivery tools directed into the vapor gap in the anode chamber including one or more fuel injectors.

31. The direct oxidation fuel cell as defined in claim 1 further comprising means for heating liquid fuel in said fuel reservoir using catalytic combustion or electric heating.

32. The direct oxidation fuel cell as defined in claim 1 wherein said membrane is substantially comprised of an intrinsic proton conducting membrane.

33. The direct oxidation fuel cell as defined in claim 32 wherein said intrinsic proton conducting membrane is substantially comprised of polyperflourosulfonic acid.

34. The direct oxidation fuel cell as defined in claim 1 wherein said membrane does not require added liquid acid electrolyte and uses liquid water to achieve good protonic conductivity.

35. A direct oxidation fuel cell, comprising:
(A) a membrane intimately interfacing with a catalyst layer along each of said membrane's major surfaces, having an anode aspect and a cathode aspect;
(B) a fuel cell housing enclosing said fuel cell;
(C) a fuel chamber filled or fed directly with fuel, said anode chamber having no liquid outlet,
(D) effective water supply from cathode to anode within said fuel cell, so that water management in said fuel cell is achieved without water collection from cathode to anode external to the active volume of the fuel cell; and
(E) at least one gas exit port defined in said anode chamber such that gaseous anode products are released directly to the ambient environment and said gas exit port being located in close proximity to said anode aspect of the membrane and said gas exit port is at least one pinhole in said membrane that directs anodic gaseous product out of said fuel cell through the membrane and, in turn, through the cathode chamber.

36. A direct oxidation fuel cell, comprising:
(A) a membrane intimately interfacing with a catalyst layer along each of said membrane's major surfaces, having an anode aspect and a cathode aspect;
(B) a fuel cell housing enclosing said fuel cell with an anode chamber being defined between said anode aspect of the membrane and an exterior portion of said cell housing;
(C) said anode chamber filled or fed directly with neat (100%) or high concentration fuel/water mixture having zero or substantially low water content and said anode chamber having no liquid outlet;
(D) effective water supply from cathode to anode within said fuel cell, so that water management in said fuel cell is achieved without water collection from the cathode and/or water transport from cathode to anode external to the active volume of the fuel cell;
(E) a passive mass transport barrier disposed in said anode chamber, said passive transport barrier controlling a rate of fuel delivery to said catalyzed anode aspect of said fuel cell; and
(F) an adjustable aperture means associated with said passive mass transport barrier such that fuel delivery through said mass transport barrier can be controlled, as well as shut-off completely, by the adjustment of said adjustable aperture means.

37. A direct oxidation fuel cell system, comprising:
(A) one or more a direct oxidation fuel cell, each including a membrane that is sufficiently thin to allow a rate of internal supply of water from a cathode to an anode side of the fuel cell to be enhanced, said membrane intimately interfacing with a catalyst along each of said membranes' major surfaces, and having an anode aspect and a cathode aspect;
(B) a fuel cell housing enclosing said one or more fuel cells;
(C) one or more fuel reservoirs providing a controlled feed of fuel to an anode aspect of one or more of said fuel cells through a passive mass transport barrier that defines the rate of fuel delivery of a level of about 10-50% higher than the rate of anodic consumption of methanol in the fuel cell in the anodic reactions of the membrane; and (D) an effective water supply from cathode to anode through said membrane wherein water management in said fuel cell is achieved without water transport from the cathode to the anode external to the active volume of the fuel cell.

38. A method of operating a direct oxidation fuel cell, comprising:

providing a direct oxidation fuel cell having with a membrane that is sufficiently thin to allow a rate of internal supply of water from a cathode side to an anode side of the fuel cell to be enhanced, said membrane interfacing with a catalyst on each of the membranes' major surfaces;

controlled feeding fuel to an anode aspect of said membrane, to a level of about 10-50% higher than the rate of anodic consumption of methanol in the fuel cell; and spontaneous flow of water back from the cathode aspect to the anode aspect across said membrane within said fuel cell whereby water management in said fuel cell is achieved without recirculation from the cathode to the anode external to the active volume of the fuel cell.

39. The method of operating a direct oxidation fuel cell as defined in claim 38 wherein said feeding of fuel is provided to achieve a predetermined limiting current density, while ensuring uniform current distribution.

40. The method as defined in claim 39 wherein said predetermined maximum limiting current density is determined by at least one of the following:

about 100–200 mA/cm$^2$ at cell operation temperature of about 10–30 deg.C.;

on the order of about 150–300 mA/cm$^2$ at cell operation temperature of about 40–60 deg.C.; and about 200–400 mA/cm$^2$ at cell operation temperature of 60–80 deg.C.

41. A direct oxidation fuel cell system comprising:

(A) membrane means intimately interfacing with a catalyst layer along each of the major surfaces of said membrane means, having an anode aspect and a cathode aspect;

(B) means for enclosing said membrane means in a fuel cell housing having no liquid outlet in an anode chamber being defined between said anode aspect of the membrane means and an exterior portion of said cell housing;

(C) means for dosing said anode aspect with neat (100%) or high concentration methanol with zero or substantially zero water content such that said methanol is face fed to the anode aspect and is consumed at a rate of fuel delivery of about 10-50% higher than a rate of anodic consumption of methanol in an anodic reaction; and (D) means for supplying water generated in a cathodic reaction across said membrane means to said anode chamber by providing a robust dense cathode backing and and a sufficiently thin membrane which allows substantially all of said water generated in said cathode reaction to be transported from cathode to anode without requiring water transport external to an active volume of the fuel cell.

42. The direct oxidation fuel cell as defined in claim 41 wherein said membrane means is a thickness of about 50 micrometers and is substantially comprised of polyperfluorosulfonic acid.

43. A direct oxidation fuel cell, comprising:

(A) a membrane, sufficiently thin to allow a rate of internal supply of water from a cathode side to an anode side of the fuel cell to be enhanced, said membrane intimately interfacing with a catalyst layer along each of said membrane's major surfaces, having an anode aspect and a cathode aspect;

(B) a fuel cell housing enclosing said fuel cell;

(C) a fuel chamber in fluid communication with said anode aspect, said fuel chamber having no liquid outlet, and being filled or fed with fuel and said fuel chamber having a passive mass transport barrier that is configured to define a rate of fuel delivery that is 1 to 1.5 times higher than a rate of anodic consumption of methanol in the fuel cell; and (D) effective water supply from cathode to anode within said fuel cell, so that water management in said fuel cell is achieved without water transport from cathode to anode external to the active volume of the fuel cell.

44. The direct oxidation fuel cell as defined in claim 43, wherein the fuel is neat methanol having substantially zero water content.

45. The direct oxidation fuel cell as defined in claim 43, wherein said passive mass transport barrier is disposed in a plane that is generally parallel to that of the anode aspect.

46. The direct oxidation fuel cell as defined in claim 43, wherein said rate of fuel delivery by said passive mass transport barrier is a defined rate calculated with reference to design cell current.

47. The direct oxidation fuel cell as defined in claim 46, wherein said defined rate is calculated such that fuel delivery is controlled to achieve a limiting cuffent density on the order of one of the following:

about 100-200 mA/cm$^2$ at cell operation temperature of about 30-40 deg.C;

on the order of about 150-300 mA/cm$^2$ at cell operation temperature of about 40-60 deg.C and about 200-400 mA/cm$^2$ at cell operation temperature of 60-80 deg.C.

48. The direct oxidation fuel cell as defined in claim 46, wherein said rate of fuel delivery by said passive mass transport barrier corresponds to a rate of fuel consumption by the fuel cell, as gauged by the design cell current at a design point of operation, multiplied by a factor of between about 1.0 and 1.5.

49. The direct oxidation fuel cell as defined in claim 43, wherein said passive mass transport barrier is a pervaporation fuel delivery membrane that effects a phase change such that liquid fuel on transporting through said fuel delivery membrane is converted to a vaporous fuel.

50. The direct oxidation fuel cell as defined in claim 49, wherein said fuel delivery membrane effects a vapor delivery rate, as gauged by a design cell current at a design point of operation multiplied by a factor of between about 1.0 and 1.5.

51. The direct oxidation fuel cell as defined in claim 49, wherein a vapor chamber is defined in a gap between said fuel delivery membrane and said anode aspect of the membrane electrolyte, said vapor chamber maintaining a significant fraction of it's volume free of liquid.

52. The direct oxidation fuel cell as defined in claim 43, wherein said passive mass transport barrier is a microporous structure having perforations that deliver and direct liquid fuel to the anode aspect of the catalyzed membrane electrolyte at a defined rate.

53. The direct oxidation fuel cell as defined in claim 52, wherein said microporous structure is disposed in a plane that is generally parallel to that of the anode aspect.

54. The direct oxidation fuel cell as defined in claim 43, wherein said passive mass transport barrier is a solid porous plug having a pore network that provides for a capillary-force-controlled flow of fuel at the defined rate.

55. The direct oxidation fuel cell as defined in claim 43, wherein said fuel is up to 100% methanol.

56. The direct oxidation fuel cell as defined in claim 43, further comprising at least one gas exit port defined in said anode chamber such that gaseous anode products are released directly to the ambient environment, and said gas exit port being located in close proximity to said anode aspect of the catalyzed membrane.

57. The direct oxidation fuel cell as defined in claim 56, wherein said gas exit port is a vent in a carbon dioxide router device.

58. The direct oxidation fuel cell as defined in claim 43, wherein water generated in a reaction at the cathode aspect of the membrane electrolyte is supplied back from a cathode to anode side of said fuel cell at rate sufficient to provide an amount of water that is required for substantially complete anodic oxidation of fuel at the highest cell current capable.

59. The direct oxidation fuel cell as defined in claim 58, further comprising a wet-proofed cathode backing disposed in the cathode chamber, and a hydrophobic microporous layer, being substantially comprised of expanded PTFE, disposed generally between the cathode backing and the cathode aspect of the catalyzed membrane electrolyte, to enhance the rate of supply of water back from the cathode side of the fuel cell to the anode side of the fuel cell.

60. The direct oxidation fuel cell as defined in claim 59, wherein said microporous layer is robust bonded to the cathode aspect by hot-pressing under controlled humidity conditions.

61. The direct oxidation fuel cell as defined in claim 59, wherein said microporous layer is secured to said cathode aspect of the membrane electrolyte by compression across the cell thickness dimension of over 50 PSI, to establish substantially sustained adherence.

62. The direct oxidation fuel cell as defined in claim 59, wherein said microporous layer that is comprised substantially of expanded PTFE also includes embedded carbon microparticles.

63. The direct oxidation fuel cell as defined in claim 59, wherein said hydrophobic microporous layer is deposited directly onto the wet-proofed cathode backing.

64. The direct oxidation fuel cell as defined in claim 43, wherein said catalyzed membrane electrolyte is sufficiently thin to allow the rate of internal supply of water from the cathode side to the anode side to be enhanced.

65. The direct oxidation fuel cell as defined in claim 64, wherein said membrane electrolyte is substantially comprised of polyperfluorosulfonic acid.

66. The direct oxidation fuel cell as defined in claim 43, further comprising one or more layer components being disposed generally adjacent a cathode backing layer in an exterior portion of said cathode chamber that faces the ambient environment to control water loss, primarily in vapor form, from the cathode chamber.

67. The direct oxidation fuel cell as defined in claim 66, wherein one or more of said layer components is substantially porous.

68. The direct oxidation fuel cell as defined in claim 66, wherein one or more of said layer components is substantially hydrophobic, or has combined, hydro-philic/hydrophobic characteristics.

69. The direct oxidation fuel cell as defined in claim 43, further comprising a one or more layer components being disposed generally in said anode chamber to control water loss from said catalyzed membrane electrolyte through the anode aspect of the membrane.

70. The direct oxidation fuel cell as defined in claim 69, wherein said component in said anode chamber is a microporous layer that is comprised substantially of expanded PTFE.

71. The direct oxidation fuel cell as defined in claim 70, wherein said microporous layer that is comprised substantially of expanded PTFE, also includes embedded carbon microparticles.

72. The direct oxidation fuel cell as defined in claim 43, further comprising additional fuel delivery tools directed into the vapor gap in the anode chamber including one or more fuel injectors.

73. The direct oxidation fuel cell as defined in claim 43, further comprising means for heating liquid fuel in said fuel reservoir using catalytic combustion or electric heating.

74. The direct oxidation fuel cell as defined in claim 43, wherein said membrane is substantially comprised of an intrinsic proton conducting membrane.

75. The direct oxidation fuel cell as defined in claim 74, wherein said intrinsic proton conducting membrane is substantially comprised of polyperflourosulfonic acid.

76. The direct oxidation fuel cell as defined in claim 43, wherein said membrane does not require added liquid acid electrolyte and uses liquid water to achieve good protonic conductivity.

77. A direct oxidation fuel cell system, comprising:
(A) one or more a direct oxidation fuel cells, each including a membrane that is sufficiently thin to allow a rate of internal supply of water from a cathode to an anode side of the fuel cell to be enhanced, said membrane intimately interfacing with a catalyst along each of said membranes' major surfaces, and having an anode aspect and a cathode aspect;
(B) a fuel cell housing enclosing said one or more fuel cells;
(C) one or more fuel reservoirs providing a controlled feed of fuel to an anode aspect of one or more of said fuel cells through a passive mass transport barrier that defines the rate of fuel delivery that is about 1.0 to 1.5 times higher than the rate of anodic consumption of methanol in the fuel cell in the anodic reactions of the membrane; and
(D) an effective water supply from cathode to anode through said membrane wherein water management in said fuel cell is achieved without water transport from the cathode to the anode external to the active volume of the fuel cell.

78. A method of operating a direct oxidation fuel cell, comprising:
providing a direct oxidation fuel cell with a membrane that is sufficiently thin to allow a rate of internal supply of water from a cathode side to an anode side of the fuel cell to be enhanced, said membrane interfacing with a catalyst on each of the membranes' major surfaces;
controlled feeding fuel to an anode aspect of said membrane, to a level that is about 1.0 to 1.5 times higher than the rate of anodic consumption of methanol in the fuel cell; and
spontaneous flow of water back from the cathode aspect to the anode aspect across said membrane within said fuel cell whereby water management in said fuel cell is achieved without recirculation from the cathode to the anode external to the active volume of the fuel cell.

79. The method of operating a direct oxidation fuel cell as defined in claim 78, wherein said feeding of fuel is provided to achieve a predetermined limiting current density, while ensuring uniform current distribution.

80. The method as defined in claim 79, wherein said predetermined limiting current density is determined by at least one of the following:

about 100-200 mA/cm$^2$ at cell operation temperature of about 30-40 deg.C; on the order of about 150-300 mA/cm$^2$ at cell operation temperature of about 40-60 deg.C; and about 200-400 mA/cm$^2$ at cell operation temperature of 60-80 deg.C.

81. A direct oxidation fuel cell system comprising:

(A) membrane means intimately interfacing with a catalyst layer along each of the major surfaces of said membrane means, having an anode aspect and a cathode aspect;

(B) means for enclosing said membrane means in a fuel cell housing having no liquid outlet in an anode chamber being defined between said anode aspect of the membrane means and an exterior portion of said cell housing;

(C) means for dosing said anode aspect with neat (100%) or high concentration methanol with zero or substantially zero water content such that said methanol is face fed to the anode aspect and is consumed at a rate of fuel delivery that is 1.0 to 1.5 times higher than a rate of anodic consumption of methanol; and (D) means for supplying water generated in a cathodic reaction across said membrane means to said anode chamber by providing a robust dense cathode backing and a sufficiently thin membrane which allows substantially all of said water generated in said cathode reaction to be transported from cathode to anode without requiring water transport external to an active volume of the fuel cell.

82. The direct oxidation fuel cell as defined in claim 81 wherein said membrane is a thickness of about 50 micrometers and is substantially comprised of polyperfluorosulfonic acid.

* * * * *